(12) United States Patent
Kadiri et al.

(10) Patent No.: US 12,127,117 B2
(45) Date of Patent: Oct. 22, 2024

(54) WAKE UP SIGNAL FOR MULTICAST GROUP NOTIFICATION

(71) Applicant: QUALCOMM Incorporated, San Diego, CA (US)

(72) Inventors: Prasad Reddy Kadiri, San Diego, CA (US); Alberto Rico Alvarino, San Diego, CA (US); Le Liu, Fremont, CA (US); Umesh Phuyal, San Diego, CA (US); Linhai He, San Diego, CA (US); Huilin Xu, Temecula, CA (US)

(73) Assignee: QUALCOMM Incorporated, San Diego, CA (US)

(*) Notice: Subject to any disclaimer, the term of this patent is extended or adjusted under 35 U.S.C. 154(b) by 414 days.

(21) Appl. No.: 17/388,434

(22) Filed: Jul. 29, 2021

(65) Prior Publication Data
US 2023/0033440 A1  Feb. 2, 2023

(51) Int. Cl.
*H04W 52/02* (2009.01)
*H04W 72/23* (2023.01)
*H04W 76/28* (2018.01)
*H04L 12/18* (2006.01)
*H04W 72/121* (2023.01)

(52) U.S. Cl.
CPC ... *H04W 52/0216* (2013.01); *H04W 52/0235* (2013.01); *H04W 76/28* (2018.02); *H04L 12/1881* (2013.01); *H04W 52/0219* (2013.01); *H04W 72/121* (2013.01); *H04W 72/23* (2023.01)

(58) Field of Classification Search
None
See application file for complete search history.

(56) References Cited

U.S. PATENT DOCUMENTS

| | | | | |
|---|---|---|---|---|
| 2005/0195760 A1* | 9/2005 | Lee | ........................ | H04L 12/189 370/312 |
| 2015/0110099 A1* | 4/2015 | Chen | ..................... | H04W 48/16 370/338 |
| 2016/0366721 A1* | 12/2016 | Song | ........................ | H04W 4/06 |
| 2017/0201964 A1* | 7/2017 | Gupta | ................... | H04W 76/40 |
| 2018/0049156 A1* | 2/2018 | Laha | ....................... | H04W 76/28 |
| 2020/0092923 A1* | 3/2020 | Abraham | ............... | H04W 76/40 |
| 2020/0120596 A1* | 4/2020 | Yu | ...................... | H04W 52/0216 |
| 2022/0078880 A1* | 3/2022 | Maleki | .............. | H04W 52/0216 |
| 2022/0182943 A1* | 6/2022 | Maleki | .............. | H04W 52/0241 |
| 2022/0217635 A1* | 7/2022 | Lee | ................... | H04W 72/0446 |
| 2022/0303902 A1* | 9/2022 | Tao | ................... | H04W 72/0446 |

(Continued)

*Primary Examiner* — Mariela Vidal Carpio
(74) *Attorney, Agent, or Firm* — Holland & Hart LLP

(57) ABSTRACT

Methods, systems, and devices for wireless communications are described. A user equipment (UE) may receive control signaling from a base station that indicates a multicast or broadcast wake up signal (WUS) format. The UE may receive a multicast or broadcast WUS from the base station during a WUS monitoring occasion of a connected mode discontinuous reception (C-DRX) cycle in accordance with the control signaling. The multicast or broadcast WUS may indicate upcoming transmissions for a set of multicast or broadcast services (MBSs). If, for example, the UE is subscribed to a first MBS from the set of MBSs and the multicast or broadcast WUS indicates an upcoming transmission for the first MBS, the UE may monitor for the upcoming transmission during an active duration of the C-DRX cycle. Otherwise, the UE may enter a sleep mode to conserve power.

28 Claims, 22 Drawing Sheets

(56) References Cited

U.S. PATENT DOCUMENTS

| | | | |
|---|---|---|---|
| 2022/0417979 A1* | 12/2022 | Papasakellariou | H04W 76/28 |
| 2023/0050355 A1* | 2/2023 | Laselva | H04W 52/0235 |
| 2023/0060961 A1* | 3/2023 | Kaikkonen | H04W 76/15 |
| 2023/0209465 A1* | 6/2023 | Zhou | H04W 4/06 |
| | | | 370/311 |

* cited by examiner

WAKE UP SIGNAL FOR MULTICAST GROUP NOTIFICATION

FIELD OF TECHNOLOGY

The following relates to wireless communications, including wake up signal (WUS) for multicast group notification.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipments (UEs).

In some wireless communications systems, a UE may receive a wake up signal (WUS) during a WUS monitoring occasion of a connected mode discontinuous reception (C-DRX) cycle and may wake up for a subsequent active duration of the C-DRX cycle based on receiving the WUS. In some cases, however, WUS signaling techniques may be improved.

SUMMARY

The described techniques relate to improved methods, systems, devices, and apparatuses that support wake up signal (WUS) for multicast group notification. Generally, the described techniques provide for notifying one or more user equipments (UEs) in a connected mode discontinuous reception (C-DRX) cycle of upcoming multicast or broadcast transmissions. A UE may receive control signaling from a base station that indicates a multicast or broadcast WUS format. The UE may receive a multicast or broadcast WUS from the base station during a WUS monitoring occasion of a C-DRX cycle in accordance with the control signaling. The multicast or broadcast WUS may indicate upcoming transmissions for a set of multicast or broadcast services (MBSs). The UE may determine whether to monitor for a multicast or broadcast transmission from the base station during an active duration of the C-DRX cycle based on the multicast or broadcast WUS. For example, if the UE is subscribed to a first MBS from the set of MBSs and the multicast or broadcast WUS indicates an upcoming transmission for the first MBS, the UE may monitor for the upcoming transmission during the active duration. Otherwise, the UE may enter a sleep mode to conserve power.

A method for wireless communications at a UE is described. The method may include receiving, from a base station, control signaling that indicates one or more parameters pertaining to a multicast or broadcast WUS format, receiving, from the base station during a WUS monitoring occasion of a C-DRX cycle, a multicast or broadcast WUS in accordance with the control signaling, and monitoring for a multicast or broadcast transmission from the base station during an active duration of the C-DRX cycle based on the multicast or broadcast WUS.

An apparatus for wireless communications at a UE is described. The apparatus may include a processor, memory coupled with the processor, and instructions stored in the memory. The instructions may be executable by the processor to cause the apparatus to receive, from a base station, control signaling that indicates one or more parameters pertaining to a multicast or broadcast WUS format, receive, from the base station during a WUS monitoring occasion of a C-DRX cycle, a multicast or broadcast WUS in accordance with the control signaling, and monitor for a multicast or broadcast transmission from the base station during an active duration of the C-DRX cycle based on the multicast or broadcast WUS.

Another apparatus for wireless communications at a UE is described. The apparatus may include means for receiving, from a base station, control signaling that indicates one or more parameters pertaining to a multicast or broadcast WUS format, means for receiving, from the base station during a WUS monitoring occasion of a C-DRX cycle, a multicast or broadcast WUS in accordance with the control signaling, and means for monitoring for a multicast or broadcast transmission from the base station during an active duration of the C-DRX cycle based on the multicast or broadcast WUS.

A non-transitory computer-readable medium storing code for wireless communications at a UE is described. The code may include instructions executable by a processor to receive, from a base station, control signaling that indicates one or more parameters pertaining to a multicast or broadcast WUS format, receive, from the base station during a WUS monitoring occasion of a C-DRX cycle, a multicast or broadcast WUS in accordance with the control signaling, and monitor for a multicast or broadcast transmission from the base station during an active duration of the C-DRX cycle based on the multicast or broadcast WUS.

Some examples of the method, apparatuses, and non-transitory computer-readable medium described herein may further include operations, features, means, or instructions for receiving the multicast or broadcast transmission from the base station during the active duration based on the monitoring.

Some examples of the method, apparatuses, and non-transitory computer-readable medium described herein may further include operations, features, means, or instructions for decoding the multicast or broadcast WUS based on a radio network temporary identifier (RNTI) associated with the multicast or broadcast WUS format, where monitoring for the multicast or broadcast transmission may be based on decoding the multicast or broadcast WUS.

In some examples of the method, apparatuses, and non-transitory computer-readable medium described herein, receiving the control signaling may include operations, features, means, or instructions for receiving, from the base station, control signaling that indicates a physical downlink control channel (PDCCH) format, a bit offset field for the PDCCH format, a timing parameter specific to the C-DRX cycle, a timing offset between the multicast or broadcast WUS and the multicast or broadcast transmission, or a combination thereof.

Some examples of the method, apparatuses, and non-transitory computer-readable medium described herein may further include operations, features, means, or instructions for identifying, based on the multicast or broadcast WUS format, a set of bits in the multicast or broadcast WUS that correspond to a set of MBSs, where the UE may be subscribed to at least one MBS in the set of MBSs.

Some examples of the method, apparatuses, and non-transitory computer-readable medium described herein may further include operations, features, means, or instructions for determining, based on the set of bits, that one or more transmissions may be scheduled for the at least one MBS in the active duration, where monitoring for the multicast or broadcast transmission may be based on the determining.

Some examples of the method, apparatuses, and non-transitory computer-readable medium described herein may further include operations, features, means, or instructions for identifying a mapping between the set of bits and the set of MBSs based on a hash function and a multicast or broadcast session identifier, where determining that one or more transmissions may be scheduled for the at least one MBS may be based on the mapping.

Some examples of the method, apparatuses, and non-transitory computer-readable medium described herein may further include operations, features, means, or instructions for determining, based on the mapping, that a first bit in the set of bits corresponds to two or more MBSs in the set of MBSs.

In some examples of the method, apparatuses, and non-transitory computer-readable medium described herein, receiving the control signaling may include operations, features, means, or instructions for receiving, from the base station, radio resource control (RRC) signaling that indicates the one or more parameters pertaining to the multicast or broadcast WUS format.

Some examples of the method, apparatuses, and non-transitory computer-readable medium described herein may further include operations, features, means, or instructions for determining that at least a part of the active duration overlaps with a second active duration of a second C-DRX cycle and receiving, from the base station, downlink control information (DCI) indicating whether the UE may be to monitor for transmissions in the active duration, the second active duration, or both, where monitoring for the multicast or broadcast transmission may be based on the DCI.

Some examples of the method, apparatuses, and non-transitory computer-readable medium described herein may further include operations, features, means, or instructions for receiving, from the base station, a message indicating a primary multicast or broadcast C-DRX configuration associated with the C-DRX cycle of the UE, a secondary multicast or broadcast C-DRX configuration associated with a second C-DRX cycle of the UE, or both, where receiving the multicast or broadcast WUS from the base station may be based on the message.

Some examples of the method, apparatuses, and non-transitory computer-readable medium described herein may further include operations, features, means, or instructions for receiving, from the base station during a WUS monitoring occasion of the second C-DRX cycle, a second multicast or broadcast WUS in accordance with the secondary multicast or broadcast C-DRX configuration.

In some examples of the method, apparatuses, and non-transitory computer-readable medium described herein, the C-DRX cycle includes a group-common C-DRX cycle.

In some examples of the method, apparatuses, and non-transitory computer-readable medium described herein, receiving the multicast or broadcast WUS may include operations, features, means, or instructions for monitoring one or more control resource sets (CORESETs) in a common frequency region (CFR) based on the control signaling and receiving the multicast or broadcast WUS from the base station based on monitoring the one or more CORESETs.

In some examples of the method, apparatuses, and non-transitory computer-readable medium described herein, receiving the multicast or broadcast WUS may include operations, features, means, or instructions for monitoring one or more common search spaces (CSSs) in accordance with the control signaling and receiving the multicast or broadcast WUS from the base station based on monitoring the one or more CSSs.

Some examples of the method, apparatuses, and non-transitory computer-readable medium described herein may further include operations, features, means, or instructions for identifying, based on the multicast or broadcast WUS format, one or more bits in the multicast or broadcast WUS that indicate dormancy information pertaining to a set of secondary cells (SCells).

Some examples of the method, apparatuses, and non-transitory computer-readable medium described herein may further include operations, features, means, or instructions for activating a discontinuous reception (DRX) timer based on receiving the multicast or broadcast WUS, where monitoring for the multicast or broadcast transmission may be based on the DRX timer.

Some examples of the method, apparatuses, and non-transitory computer-readable medium described herein may further include operations, features, means, or instructions for transmitting, to the base station, a capability message indicating a capability of the UE to receive multicast or broadcast WUSs, where receiving the multicast or broadcast WUS may be based on the capability message.

A method for wireless communications at a base station is described. The method may include transmitting control signaling that indicates one or more parameters pertaining to a multicast or broadcast WUS format, transmitting, to a group of UEs in a C-DRX cycle, a multicast or broadcast WUS in accordance with the control signaling, and transmitting a multicast or broadcast transmission to the group of UEs in accordance with the multicast or broadcast WUS.

An apparatus for wireless communications at a base station is described. The apparatus may include a processor, memory coupled with the processor, and instructions stored in the memory. The instructions may be executable by the processor to cause the apparatus to transmit control signaling that indicates one or more parameters pertaining to a multicast or broadcast WUS format, transmit, to a group of UEs in a C-DRX cycle, a multicast or broadcast WUS in accordance with the control signaling, and transmit a multicast or broadcast transmission to the group of UEs in accordance with the multicast or broadcast WUS.

Another apparatus for wireless communications at a base station is described. The apparatus may include means for transmitting control signaling that indicates one or more parameters pertaining to a multicast or broadcast WUS format, means for transmitting, to a group of UEs in a C-DRX cycle, a multicast or broadcast WUS in accordance with the control signaling, and means for transmitting a multicast or broadcast transmission to the group of UEs in accordance with the multicast or broadcast WUS.

A non-transitory computer-readable medium storing code for wireless communications at a base station is described. The code may include instructions executable by a processor to transmit control signaling that indicates one or more parameters pertaining to a multicast or broadcast WUS format, transmit, to a group of UEs in a C-DRX cycle, a multicast or broadcast WUS in accordance with the control signaling, and transmit a multicast or broadcast transmission to the group of UEs in accordance with the multicast or broadcast WUS.

Some examples of the method, apparatuses, and non-transitory computer-readable medium described herein may further include operations, features, means, or instructions for encoding the multicast or broadcast WUS based on a RNTI associated with the multicast or broadcast WUS format, where transmitting the multicast or broadcast WUS may be based on encoding the multicast or broadcast WUS.

In some examples of the method, apparatuses, and non-transitory computer-readable medium described herein, transmitting the control signaling may include operations, features, means, or instructions for transmitting RRC signaling that indicates a PDCCH format, a bit offset field for the PDCCH format, a timing parameter specific to the C-DRX cycle, a timing offset between the multicast or broadcast WUS and the multicast or broadcast transmission, or a combination thereof.

In some examples of the method, apparatuses, and non-transitory computer-readable medium described herein, transmitting the multicast or broadcast WUS may include operations, features, means, or instructions for transmitting the multicast or broadcast WUS in one or more CORESETs of a CFR.

In some examples of the method, apparatuses, and non-transitory computer-readable medium described herein, transmitting the multicast or broadcast WUS may include operations, features, means, or instructions for transmitting the multicast or broadcast WUS in one or more CSSs.

Some examples of the method, apparatuses, and non-transitory computer-readable medium described herein may further include operations, features, means, or instructions for receiving, from a first UE in the group of UEs, a capability message indicating a capability of the first UE to receive multicast or broadcast WUSs, where transmitting the multicast or broadcast WUS may be based on the capability message.

In some examples of the method, apparatuses, and non-transitory computer-readable medium described herein, the C-DRX cycle includes a group-common C-DRX cycle.

DETAILED DESCRIPTION

Figure 1:
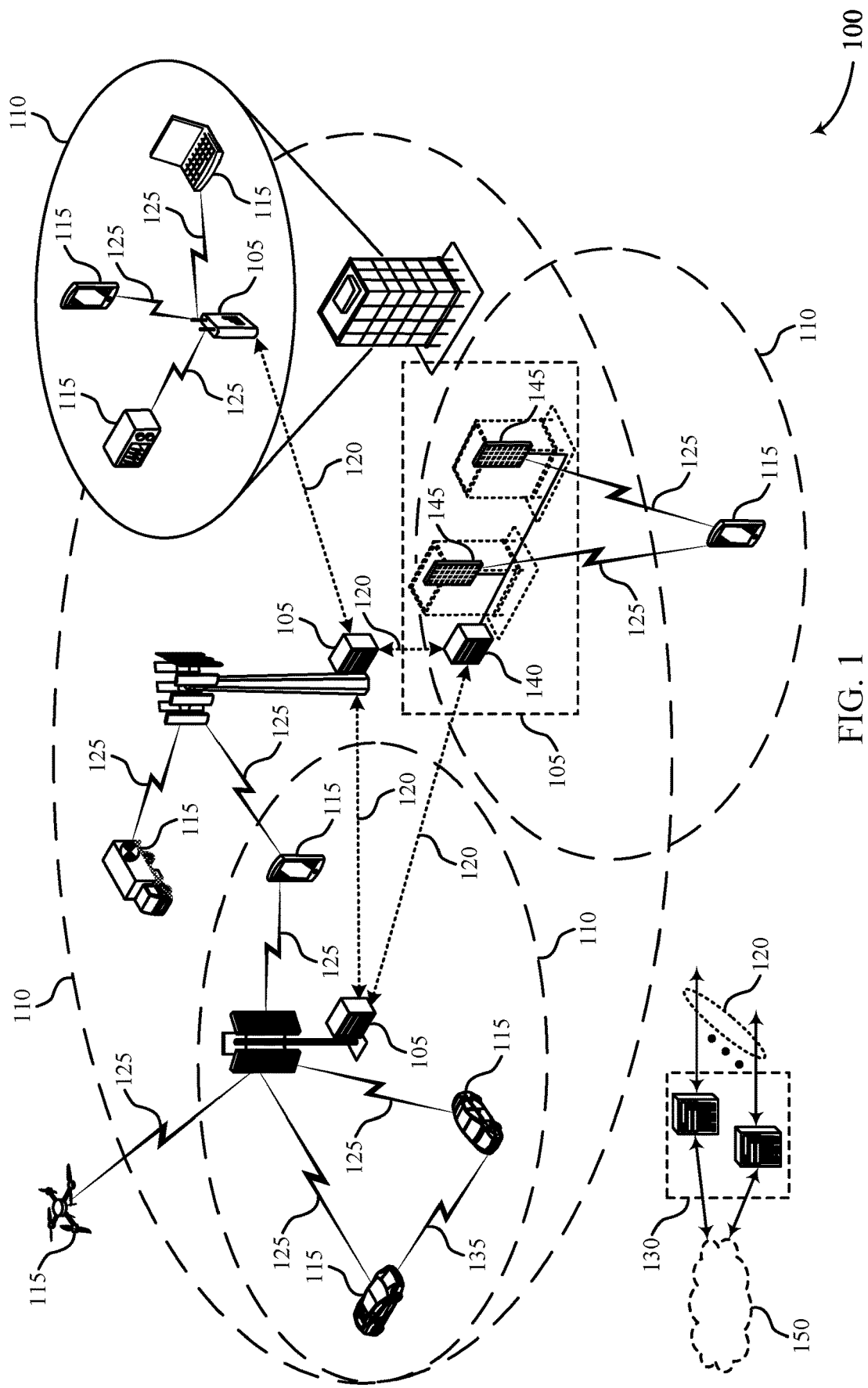
FIGS. 1 and 2 illustrate examples of wireless communications systems that support wake up signal (WUS) for multicast group notification in accordance with aspects of the present disclosure.

In some wireless communications systems, a user equipment (UE) may enter a connected-mode discontinuous reception (C-DRX) cycle to reduce power consumption during periods of inactivity. The C-DRX cycle may include active durations (in which the UE monitors a physical downlink control channel (PDCCH)) and inactive durations (in which the UE enters sleep mode). The C-DRX cycle may also include wake up signal (WUS) monitoring occasions in which the UE wakes up for a relatively short duration (e.g., shorter than the active durations) to monitor the PDCCH for a WUS. If the UE detects a WUS during a WUS monitoring occasion, the UE may wake up to monitor the PDCCH during the next active duration. Otherwise, the UE can enter sleep mode and refrain from monitoring the PDCCH during the next active duration, which may result in greater power savings at the UE.

In some cases, the UE may be configured with different C-DRX configurations. For example, the UE may be configured with a unicast C-DRX configuration, a broadcast C-DRX configuration, a multicast C-DRX configuration, or a combination thereof. In some cases, however, broadcast and multicast C-DRX configurations may not support WUS signaling. That is, the UE may be unable to receive a WUS for multicast or broadcast purposes, which may reduce the power savings associated with multicast or broadcast C-DRX cycles.

In accordance with aspects of the present disclosure, a base station may configure the UE with a multicast or broadcast WUS format such that the UE can receive multicast or broadcast WUSs during WUS monitoring occasions of a multicast or broadcast C-DRX cycle. A multicast or broadcast WUS, which may be equivalently referred to as a PDCCH WUS or a multicast or broadcast service (MBS) WUS, may indicate upcoming transmissions for a set of MBSs. Specifically, the MBS WUS may indicate, for each MBS in a set of MBSs, whether there is at least one transmission scheduled in the next active duration of an MBS C-DRX cycle (e.g., a multicast or broadcast C-DRX cycle).

The UE may determine whether to wake up for the next active duration based on receiving the MBS WUS. For example, if the UE is subscribed to a first MBS and the MBS WUS indicates an upcoming transmission for the first MBS, the UE may monitor for the upcoming transmission in the next active duration. Alternatively, if the UE is not subscribed to any MBSs with transmissions scheduled in the next active duration, the UE may enter sleep mode and refrain from waking up during the next active duration, which may reduce power consumption at the UE.

Aspects of the present disclosure may be implemented to realize one or more of the following advantages. The described techniques may provide for improved C-DRX operations at a UE. Specifically, aspects of the present disclosure may support techniques for reduced power consumption at a UE (e.g., a UE in a C-DRX cycle) based on enabling the UE to operate in sleep mode for a longer duration. For example, the described techniques may enable the UE to determine, based on receiving an MBS WUS from a base station during a WUS monitoring occasion of an MBS C-DRX cycle, whether the UE is subscribed to any MBSs with upcoming transmissions. If the UE is not subscribed to any MBSs with upcoming transmissions, the UE may remain in a C-DRX inactive mode (e.g., a sleep mode) for a longer duration, which may result in greater power savings at the UE.

Aspects of the disclosure are initially described in the context of wireless communications systems, communication schemes, WUS formats, and process flows. Aspects of the disclosure are further illustrated by and described with reference to apparatus diagrams, system diagrams, and flowcharts that relate to WUS for multicast group notification.

FIG. 1 illustrates an example of a wireless communications system 100 that supports WUS for multicast group notification in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space (CSS) sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof.

For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting.

MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

Some wireless communications systems may support broadcast services for UEs 115 in different connectivity states (e.g., RRC_CONNECTED, RRC_IDLE, RRC_INACTIVE). In some cases, a base station 105 may employ a single carrier point to multipoint (SC-PTM) communication scheme to support these broadcast services. Additionally or alternatively, some wireless communications systems may support multicast services for UEs 115 in a connected state (e.g., RRC_CONNECTED). In some cases, UEs 115 in an idle state (e.g., RRC_IDLE) or an inactive state (e.g., RRC_INACTIVE) may also receive multicast services (e.g., low reliability quality of service (QoS) services).

In addition to supporting broadcast and multicast services, some wireless communications systems may support discontinuous reception (DRX) operations to reduce power consumption at a UE 115. Specifically, a base station 105 may configure a UE 115 with a DRX cycle that includes one or more DRX active durations (in which the UE 115 performs PDCCH monitoring) and one or more DRX inactive durations (in which the UE 115 enters a sleep mode). A UE 115 in a DRX mode may be configured to monitor for a WUS outside of a DRX active duration. That is, the UE 115 may be configured with a DRX cycle that includes a set of WUS monitoring occasions.

A WUS may indicate whether a MAC entity of the UE 115 should start a timer (e.g., drx-onDurationTimer) for the next DRX active duration. In some cases, the WUS may not affect other timers (e.g., bwp-inactivityTimer, dataInactivityTimer, and sCellDeactivationTimer) of the UE 115. The WUS may be a PDCCH signal defined by a specific downlink control information (DCI) format (e.g., DCI format 2_6) with a cyclic redundancy check (CRC) scrambled by a power saving radio network temporary identifier (PS-RNTI). A WUS can be configured on a primary cell (PCell) or a primary secondary cell (PSCell). A WUS may indicate dormancy behavior for a number (e.g., 5) of secondary cell (SCell) groups. In some cases, a WUS can be jointly received by a group of UEs 115. For example, the group of UEs 115 may receive a WUS based on monitoring one or more CSS sets.

In some cases, a UE 115 may be configured with a primary unicast DRX configuration and a secondary unicast DRX configuration. The primary and secondary DRX configurations may correspond to serving cells operating in specific frequency ranges (e.g., frequency range 1 (FR1) and frequency range 2 (FR2)). In other cases, a group of UEs 115 may be configured with a group-common DRX configuration or a C-DRX configuration. C-DRX configurations may pertain to UEs 115 in a connected state, whereas DRX configurations may pertain to UEs 115 in an idle or inactive state.

To support point to multipoint (PTM) transmission of NR multicast services to UEs 115 in a connected state (e.g., RRC_CONNECTED), a base station 105 may configure a UE 115 with an MBS C-DRX configuration using a group radio network temporary identifier (G-RNTI). Additionally, the base station 105 may employ group paging (e.g., using an MBS session identifier (ID)) to indicate a multicast session activation for UEs 115 in an idle or inactive state. Specifically, the base station 105 may send group paging messages to a group of idle or inactive UEs 115 during a unicast paging occasion (PO).

In accordance with aspects of the present disclosure, a UE 115 may experience improved power savings based on receiving a PDCCH WUS for MBS C-DRX monitoring (e.g., for UEs 115 in a connected state). The PDCCH WUS may indicate upcoming transmissions for a set of MBSs. Specifically, the PDCCH WUS may indicate, for each MBS in the set of MBSs, whether there is a transmission scheduled in an upcoming MBS C-DRX active duration. A UE 115 configured with an MBS C-DRX configuration may receive the PDCCH WUS and may determine whether to wake up during the upcoming MBS C-DRX active duration based on the PDCCH WUS. If, for example, the UE 115 is subscribed to an MBS with a transmission scheduled in the upcoming MBS C-DRX active duration, the UE 115 may wake up to monitor for the transmission in the upcoming MBS C-DRX active duration. Alternatively, if the UE 115 is not subscribed to any MBSs with transmissions scheduled in the upcoming MBS C-DRX active duration, the UE 115 may remain in sleep mode for the upcoming MBS C-DRX active duration, which may result in greater power savings at the UE 115, among other benefits.

Figure 2:
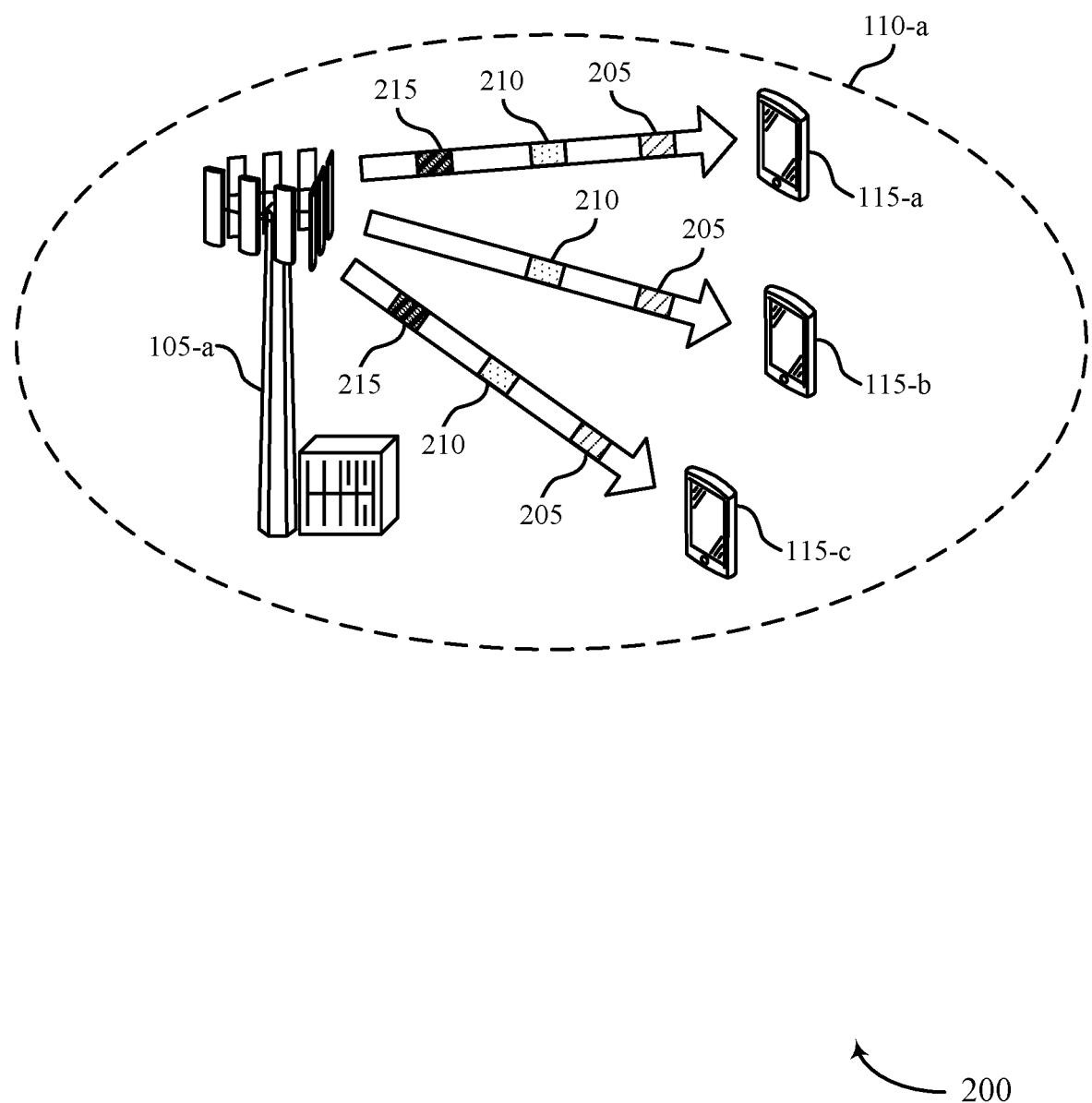

FIG. 2 illustrates an example of a wireless communications system 200 that supports WUS for multicast group notification in accordance with aspects of the present disclosure. The wireless communications system 200 may implement or be implemented by aspects of the wireless communications system 100. For example, the wireless communications system 200 may include a base station 105-*a*, a UE 115-*a*, a UE 115-*b*, and a UE 115-*c*, which may be examples of corresponding devices described with reference to FIG. 1. The base station 105-*a* may communicate with the UEs 115 in a geographic coverage area 110-*a*, which may be an example of a geographic coverage area 110 described with reference to FIG. 1. In the wireless communications system 200, one or more of the UEs 115 may monitor for an MBS transmission 215 from the base station 105-*a* based on receiving an MBS WUS 210 from the base station 105-*a* in accordance with control signaling 205.

In some wireless communications systems, the UEs 115 may enter a C-DRX cycle to reduce power consumption during periods of inactivity. The C-DRX cycle may include active durations and inactive durations, as described with reference to FIG. 1. The C-DRX cycle may also include WUS monitoring occasions in which the UEs 115 are configured to wake up for a relatively short duration to monitor for a WUS. If the UEs 115 detect a WUS during a WUS monitoring occasion, the UEs 115 may wake up to perform PDCCH monitoring during the next active duration of the C-DRX cycle. Otherwise, the UEs 115 may enter sleep mode for the next active duration, which may result in greater power savings at the UEs 115.

In some cases, the UEs 115 may be configured with different C-DRX configurations. For example, the UEs 115 may be configured with a unicast C-DRX configuration, a broadcast C-DRX configuration, a multicast C-DRX configuration, or a combination thereof. In some cases, however, broadcast and multicast C-DRX configurations may not support WUS signaling. That is, the UEs 115 may be unable to receive a WUS for multicast or broadcast purposes, which may reduce the power savings associated with multicast or broadcast C-DRX cycles.

In some examples, the wireless communications system 200 may support multicast reception for the UEs 115, even if the UEs 115 are in an RRC_INACTIVE state. If, for example, the UE 115-*a* is scheduled to receive low reliability multicast services in an RRC_INACTIVE state and the UE 115-*b* is scheduled to receive low reliability multicast services in an RRC_CONNECTED state, the base station 105-*a* may configure common multicast DRX for the UE 115-*a* and the UE 115-*b*. For RRC_INACTIVE UEs 115, either a PDCCH WUS or a paging early indication (PEI), such as a PDCCH PEI or a sequence-based PEI, may be used to inform multicast UEs 115 of whether to wake up in the next active duration (e.g., DRX ON period).

The wireless communications system 200 may also support broadcast reception in RRC_IDLE and RRC_INACTIVE states. Some broadcast services (e.g., NR Broadcast services) can be received by UEs 115 in all RRC states. Broadcast DRX may be configured for receiving NR broadcast services. In some cases, the UEs 115 may not be configured to transmit feedback for these broadcast services. Similar to multicast, either PDCCH WUS or PEI can be used to notify the UEs 115 of whether to wake up in the next broadcast DRX active duration (e.g., DRX ON period). The network (e.g., the base station 105-*a*) may configure the UEs 115 (e.g., via a multicast control channel (MCCH)) to indicate whether early wake up indication is configured for a broadcast DRX cycle.

In accordance with aspects of the present disclosure, the base station 105-*a* may configure the UEs 115 with an MBS WUS format such that the UEs 115 can receive MBS WUSs during WUS monitoring occasions of an MBS C-DRX cycle. The base station 105-*a* may configure the UEs 115 with the MBS WUS format based on transmitting control signaling 205 to the UEs 115. In some examples, the control signaling 205 may include RRC signaling indicating a PDCCH format for MBS WUSs, a bit offset pertaining to the PDCCH format, an MBS C-DRX active duration timer, a timing offset field (e.g., mbs-ps-offset), or a combination thereof. The base station 105-*a* may transmit an MBS WUS 210 to the UEs 115 in accordance with the control signaling 205. The MBS WUS 210 may indicate upcoming transmissions for a set of MBSs in the next active duration of the MBS C-DRX cycle. Specifically, the MBS WUS 210 may indicate, for each MBS in a set of MBSs, whether there is at least one transmission scheduled in the next active duration.

The UEs 115 may determine whether to wake up for the next active duration based on receiving the MBS WUS 210. For example, if the UE 115-*a* and the UE 115-*c* are subscribed to a first MBS and the MBS WUS 210 indicates an upcoming transmission for the first MBS, the UE 115-*a* and the UE 115-*c* may monitor for the upcoming transmission in the next active duration. In contrast, if the UE 115-*b* is not subscribed to any MBSs with transmissions scheduled in the next active duration, the UE 115-*b* may enter sleep mode and refrain from waking up during the next active duration, which may reduce power consumption at the UE 115-*b*.

The wireless communications system 200 may support techniques for reduced power consumption at the UEs 115 based on enabling the UEs 115 to operate in a sleep mode for a longer duration. For example, the described techniques may enable the UE 115-*a* to determine, based on receiving the MBS WUS 210 from the base station 105-*a* during a WUS monitoring occasion of an MBS C-DRX cycle, whether the UE 115-*a* is subscribed to any MBSs with upcoming transmissions. If the UE 115-*a* is not subscribed to any MBSs with upcoming transmissions, the UE 115-*a* may remain in a C-DRX inactive mode for a longer duration, which may result in greater power savings at the UE 115-*a*.

Figure 3:
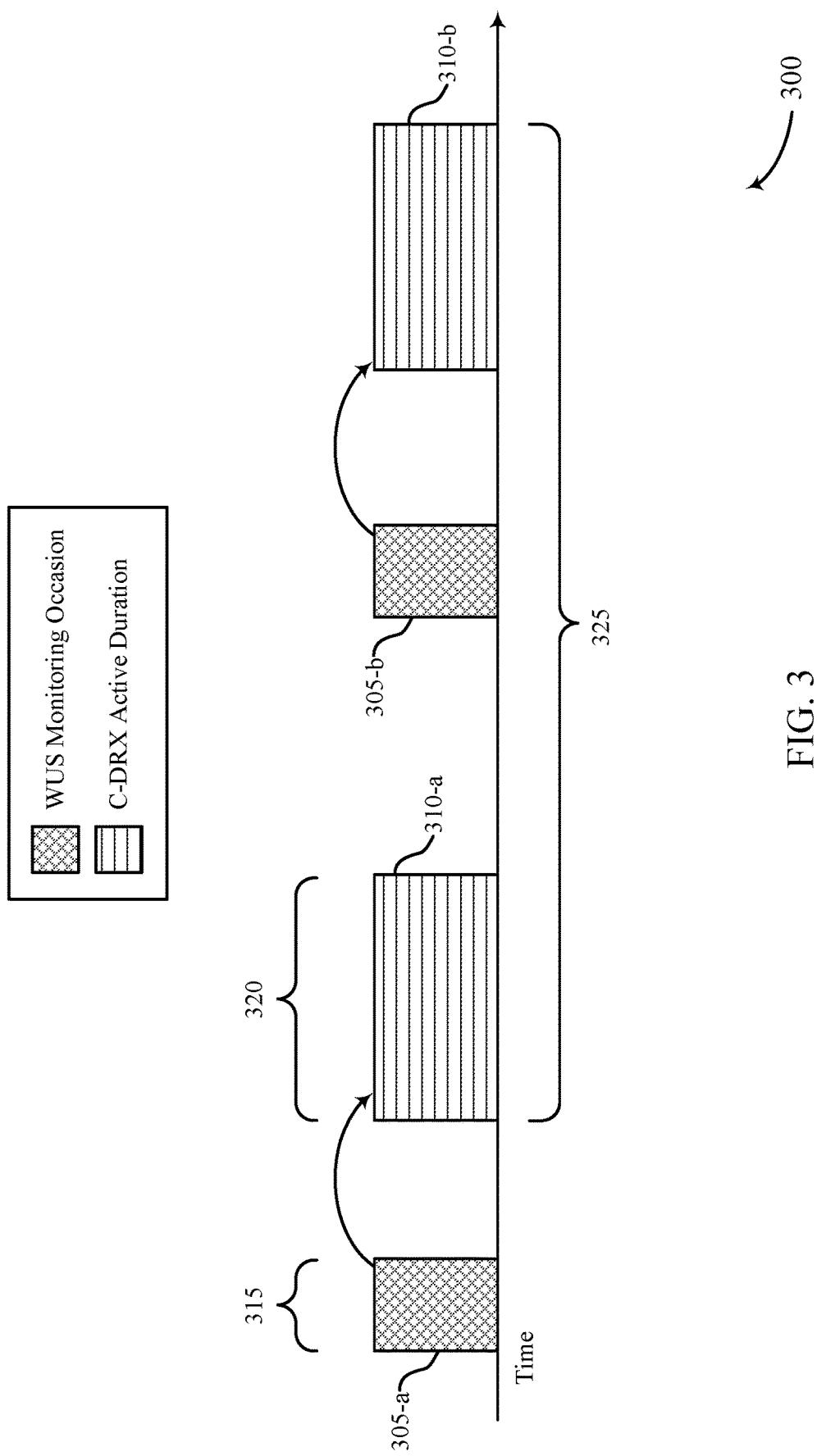
FIG. 3 illustrates an example of a communication scheme that supports WUS for multicast group notification in accordance with aspects of the present disclosure.

FIG. 3 illustrates an example of a communication scheme 300 that supports WUS for multicast group notification in accordance with aspects of the present disclosure. The communication scheme 300 may implement or be implemented by aspects of the wireless communications system 100 or the wireless communications system 200. For example, the communication scheme 300 may be implemented by a UE 115 or a base station 105, which may be examples of corresponding devices described with reference to FIGS. 1 and 2. In the communication scheme 300, a UE 115 may determine whether to wake up during C-DRX active durations 310 based on monitoring for WUSs in WUS monitoring occasions 305 associated with the C-DRX active durations 310.

In the example of FIG. 3, a UE 115 may be configured with a C-DRX configuration, which may include C-DRX active durations 310 and WUS monitoring occasions 305 corresponding to the C-DRX active durations 310. For example, a WUS monitoring occasion 305-*a* may correspond to a C-DRX active duration 310-*a* and a WUS monitoring occasion 305-*b* may correspond to a C-DRX active duration 310-*b*. The UE 115 may determine whether to wake up in the C-DRX active duration 310-*a* based on whether the UE 115 receives a WUS in the WUS monitoring occasion 305-*a*. Likewise, the UE 115 may determine whether to wake up in the C-DRX active duration 310-*b* based on whether the UE 115 receives a WUS in the WUS monitoring occasion 305-*b*.

In some examples, the C-DRX configuration may also include a C-DRX cycle duration 325, which may represent a time interval between the C-DRX active duration 310-*a* and the C-DRX active duration 310-*b*. Additionally or alternatively, the C-DRX configuration may indicate a WUS monitoring duration 315 pertaining to the WUS monitoring occasions 305, a DRX active duration timer 320 pertaining to the C-DRX active durations 310, or both. Upon expiration of the DRX active duration timer 320, the UE 115 may enter a low-power state (e.g., sleep mode) until a subsequent WUS monitoring occasion.

In some cases, the UE 115 may be configured with different C-DRX configurations. For example, the UE 115 may be configured with a unicast C-DRX configuration, a broadcast C-DRX configuration, a multicast C-DRX configuration, or a combination thereof. In some cases, however, broadcast and multicast C-DRX configurations may not support WUS signaling. That is, the UE 115 may be unable to receive a WUS for multicast or broadcast purposes, which may reduce the power savings associated with multicast or broadcast C-DRX cycles.

In accordance with aspects of the present disclosure, a base station 105 may configure the UE 115 with an MBS WUS format such that the UE 115 can receive MBS WUSs during WUS monitoring occasions of a multicast or broadcast C-DRX cycle. An MBS WUS may indicate upcoming transmissions for a set of MBSs. Specifically, the MBS WUS may indicate, for each MBS in a set of MBSs, whether there is at least one transmission scheduled in the next active duration of an MBS C-DRX cycle (e.g., a multicast or broadcast C-DRX cycle).

The UE 115 may determine whether to wake up for the next active duration of the MBS C-DRX cycle based on receiving the MBS WUS during a WUS monitoring occasion. For example, if the UE 115 is subscribed to a first MBS and the MBS WUS indicates an upcoming transmission for the first MBS, the UE 115 may monitor for the upcoming transmission in the next active duration of the MBS C-DRX cycle. Alternatively, if the UE 115 is not subscribed to any MBSs with transmissions scheduled in the next active duration of the MBS C-DRX cycle, the UE 115 may enter sleep mode and refrain from waking up during the next active duration, which may reduce power consumption at the UE 115.

The communication scheme 300 may support techniques for reduced power consumption at a UE 115 based on enabling the UE 115 to operate in a sleep mode for a longer duration. For example, the described techniques may enable a UE 115 to determine, based on receiving an MBS WUS from a base station 105 during a WUS monitoring occasion of an MBS C-DRX cycle, whether the UE 115 is subscribed to any MBSs with upcoming transmissions. If the UE 115 is not subscribed to any MBSs with upcoming transmissions, the UE 115 may remain in a C-DRX inactive mode for a longer duration, which may result in greater power savings at the UE 115.

Additionally, the described techniques may enable a base station 105 to indicate a number of upcoming MBS transmissions with a single MBS WUS rather than multiple UE-specific WUSs. In other words, the base station 105 may transmit a single MBS WUS to a group of UEs 115 (e.g., UEs 115 in an MBS C-DRX cycle), as opposed to transmitting a UE-specific WUS to each UE 115 in the group of UEs 115. As a result, the described techniques may enable the base station 105 to indicate upcoming MBS transmissions with improved efficiency and reduced signaling overhead, among other benefits.

FIGS. 4A, 4B, 4C, and 4D illustrate examples of a WUS format 400, a WUS format 401, a WUS format 402, and a WUS format 403, respectively, that support WUS for multicast group notification in accordance with aspects of the present disclosure. The WUS format 400, the WUS format 401, the WUS format 402, and the WUS format 403 may implement or be implemented by aspects of the wireless communications system 100 or the wireless communications system 200. For example, the WUS format 400, the WUS format 401, the WUS format 402, and the WUS format 403 may be implemented by a UE 115 or a base station 105, which may be examples of corresponding devices described with reference to FIGS. 1 and 2. The WUS format 400, the WUS format 401, the WUS format 402, and the WUS format 403 may enable a base station 105 (or another network entity) to indicate upcoming MBS transmissions with greater processing efficiency and lower signaling overhead.

Figure 4A:
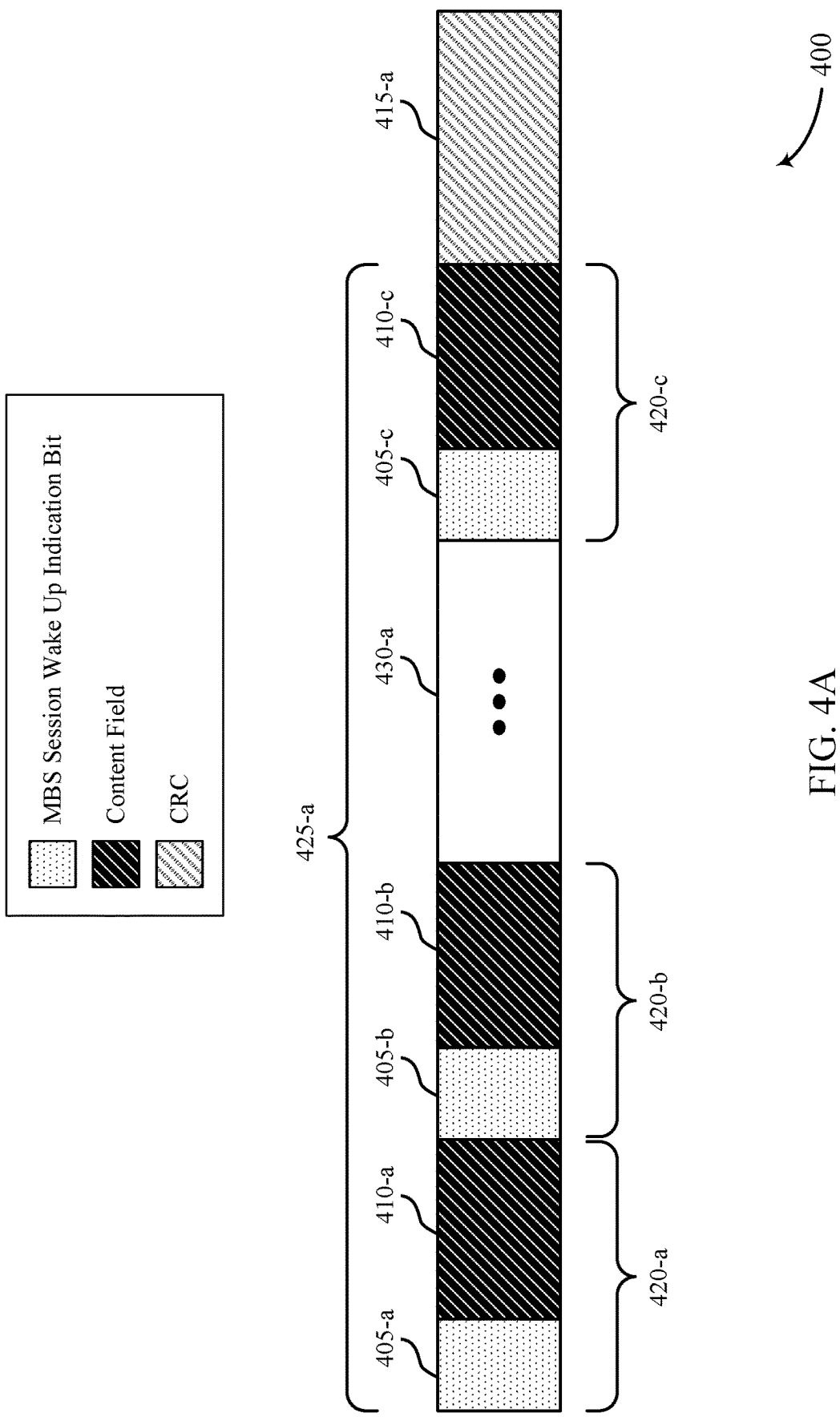
FIGS. 4A, 4B, 4C, and 4D illustrate examples of WUS formats that support WUS for multicast group notification in accordance with aspects of the present disclosure.

FIG. 4A illustrates an example of a WUS format 400. The WUS format 400 may include MBS session wake up indication bits 405, content fields 410, MBS-specific fields 420, MBS-specific fields 430-a, and a CRC 415-a. The MBS session wake up indication bits 405, the content fields 410, the MBS-specific fields 420, and the MBS-specific fields 430-a may correspond to a payload size 425-a of the WUS format 400, which may be an example of a first DCI format (e.g., DCI format 2_6). The MBS-specific fields 420 may include MBS session wake up indication bits 405 and content fields 410. For example, MBS-specific fields 420-a may include an MBS session wake up indication bit 405-a and a content field 410-a. Likewise, MBS-specific fields 420-b may include an MBS session wake up indication bit 405-b and a content field 410-b, and MBS-specific fields 420-c may include an MBS session wake up indication bit 405-c and a content field 410-c. Each of the MBS-specific fields 420 may correspond to an MBS in a group of MBSs.

A UE 115 may receive an MBS WUS in accordance with the WUS format 400 and may determine whether to wake up for a subsequent MBS C-DRX active duration based on receiving the MBS WUS. To differentiate the WUS format 400 (e.g., an MBS WUS format) from other unicast WUS formats, the CRC 415-a may be scrambled with an MBS PS RNTI that is different from a unicast PS RNTI. Accordingly, the UE 115 may determine that the WUS format 400 is an MBS WUS based on using the MBS PS-RNTI to decode the CRC 415-a. After decoding the MBS WUS, the UE 115 may determine whether to wake up or return to sleep mode based on the MBS session wake up indication bits 405.

As an example, if the MBS session wake up indication bit 405-a corresponds to a first MBS and the UE 115 is subscribed to the first MBS, the UE 115 may determine whether there are any transmissions scheduled for the first MBS based on the MBS session wake up indication bit 405-a. If, for example, the MBS session wake up indication bit 405-a indicates a transmission scheduled for the first MBS, the UE 115 may monitor for the transmission in an upcoming MBS C-DRX active duration. Otherwise, the UE 115 may return to sleep mode, which may result in greater power savings at the UE 115.

In some examples, the base station 105 may configure the UE 115 with a different group-common DRX configuration for each MBS in a group of MBSs. In other examples, the base station 105 may configure the UE 115 with a single group-common DRX configuration for the group of MBSs. The base station 105 may configure the UE 115 using an existing PDCCH format (e.g., PDCCH format 2_6), which may include up to a threshold number of bits (e.g., 140 bits). In some examples, each MBS in the group of MBSs may correspond to one of the MBS session wake up indication bits 405, and the UE 115 may ignore the content fields 410.

Figure 4B:
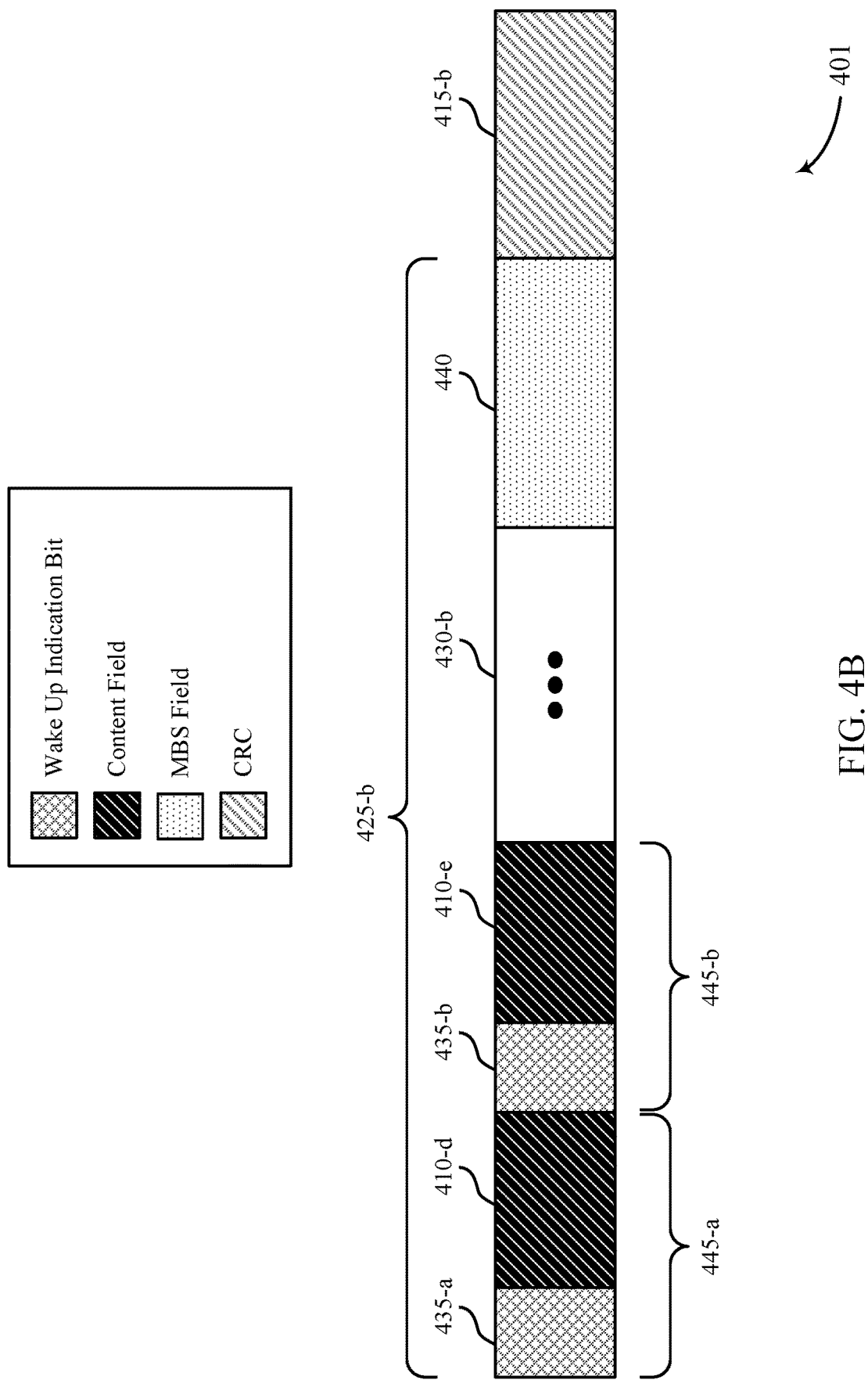

FIG. 4B illustrates an example of a WUS format 401. The WUS format 401 may include wake up indication bits 435, content fields 410, UE-specific fields 445, UE-specific fields 430-b, an MBS field 440, and a CRC 415-b. The wake up indication bits 435, the content fields 410, the UE-specific fields 445, the UE-specific fields 430-b, and the MBS field 440 may correspond to a payload size 425-b of the WUS format 401, which may be an example of a first DCI format (e.g., DCI format 2_6). The UE-specific fields 445 may include wake up indication bits 435 and content fields 410. For example, UE-specific fields 445-a may include a wake up indication bit 435-a and a content field 410-d. Likewise, UE-specific fields 445-b may include a wake up indication bit 435-b and a content field 410-e. Each of the UE-specific fields 445 may correspond to a specific UE in a group of UEs. In contrast, the MBS field 440 may correspond to an MBS or a group of MBSs. Specifically, the MBS field 440 may indicate whether there are any transmissions scheduled for an MBS (or group of MBSs).

A UE 115 may receive an MBS WUS in accordance with the WUS format 401 and may determine whether to wake up for a subsequent C-DRX active duration based on receiving the MBS WUS. To differentiate the WUS format 401 (e.g., an MBS WUS format) from other unicast WUS formats, the CRC 415-b may be scrambled with an MBS PS RNTI that is different from a unicast PS RNTI. Accordingly, the UE 115 may determine that the WUS format 401 is an MBS WUS based on using the MBS PS-RNTI to decode the CRC 415-b. After decoding the MBS WUS, the UE 115 may determine whether to wake up or return to sleep mode based on the UE-specific fields 445 and the MBS field 440.

As an example, if the wake up indication bit 405-a corresponds to the UE 115 and indicates an upcoming unicast transmission (e.g., a UE-specific transmission for the UE 115), the UE 115 may monitor for the transmission in an upcoming C-DRX active duration. Otherwise, the UE 115 may return to sleep mode, which may result in greater power savings at the UE 115. Additionally or alternatively, if the MBS field 440 indicates a transmission scheduled for an MBS (or group of MBSs) to which the UE 115 is subscribed, the UE 115 may wake up during a subsequent MBS C-DRX active duration to monitor for the transmission. In contrast, if the MBS field 440 does not indicate any transmissions scheduled for MBSs to which the UE 115 is subscribed, the UE 115 may enter sleep mode to conserve power.

Figure 4C:
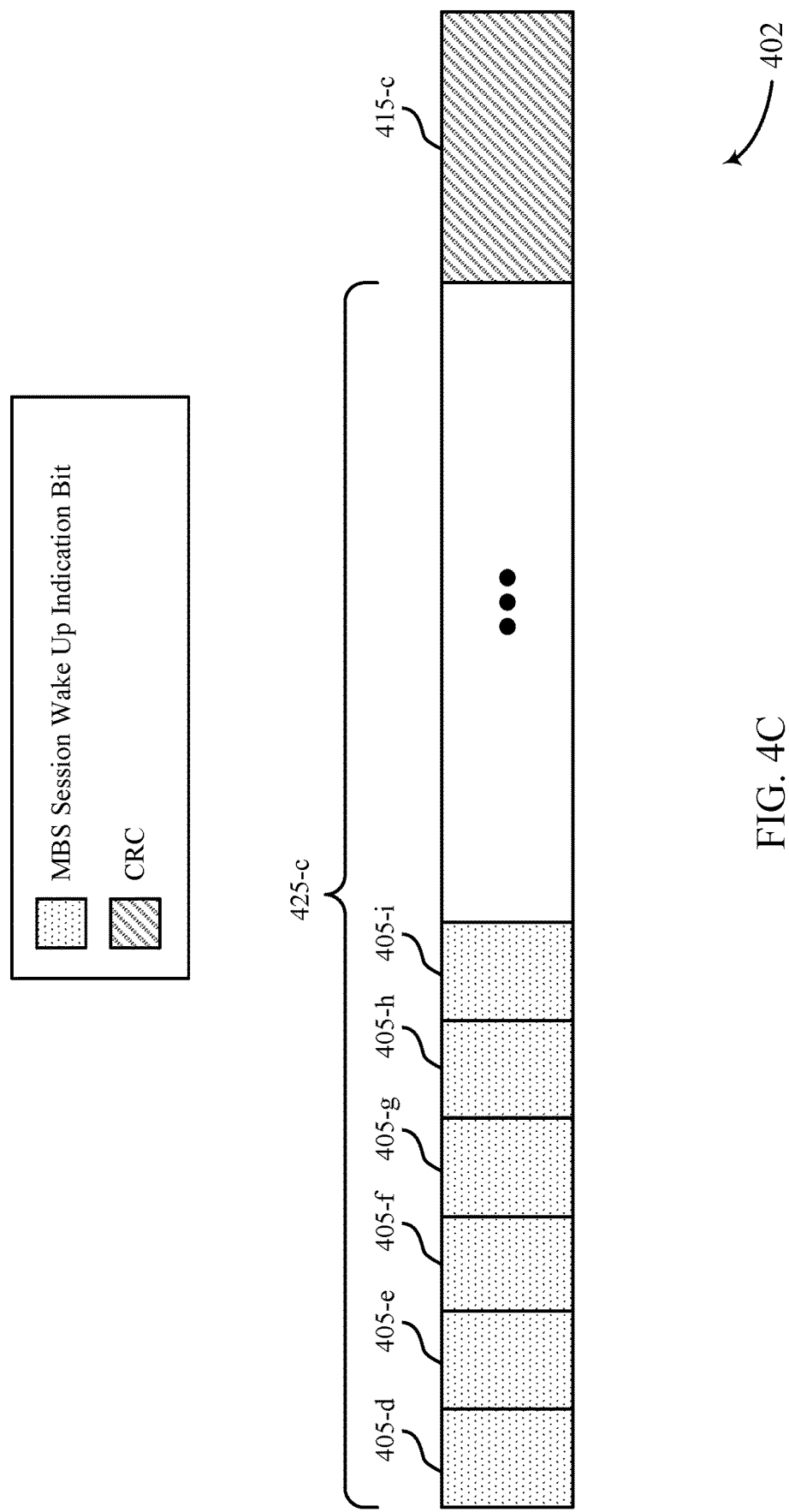

FIG. 4C illustrates an example of a WUS format 402. The WUS format 402 may include MBS session wake up indication bits 405 and a CRC 415-c. The MBS session wake up indication bits 405 may correspond to a payload size 425-c of the WUS format 402, which may be an example of a first DCI format (e.g., DCI format 2_6). Each of the MBS session wake up indication bits 405 may correspond to a single MBS or a group of MBSs. For example, an MBS session wake up indication bit 405-d may correspond to a first MBS, an MBS session wake up indication bit 405-e may correspond to a second MBS, an MBS session wake up indication bit 405-f may correspond to a third MBS, an MBS session wake up indication bit 405-g may correspond to a fourth MBS, an MBS session wake up indication bit 405-h may correspond to a fifth MBS, and an MBS session wake up indication bit 405-i may correspond to a sixth MBS. In some examples, the MBS session wake up indication bit 405-d may correspond to multiple MBSs.

A UE 115 may receive an MBS WUS in accordance with the WUS format 402 and may determine whether to wake up for a subsequent MBS C-DRX active duration based on receiving the MBS WUS. To differentiate the WUS format 402 (e.g., an MBS WUS format) from other unicast WUS formats, the CRC 415-c may be scrambled with an MBS PS RNTI that is different from a unicast PS RNTI. Accordingly, the UE 115 may determine that the WUS format 402 corresponds to an MBS WUS based on using the MBS PS-RNTI to decode the CRC 415-b. After decoding the MBS WUS, the UE 115 may determine whether to wake up or return to sleep mode based on the MBS session wake up indication bits 405.

As an example, if the MBS session wake up indication bit 405-d corresponds to a first MBS and the UE 115 is subscribed to the first MBS, the UE 115 may determine whether to wake up or remain in sleep mode based on the MBS session wake up indication bit 405-d. If, for example, the MBS session wake up indication bit 405-d indicates a transmission scheduled for the first MBS, the UE 115 may monitor for the transmission in an upcoming MBS C-DRX active duration. In other words, if an MBS WUS wake-up bit for the first MBS is a 1, a MAC entity of the UE 115 may activate an MBS-specific DRX ON Duration timer for the next DRX cycle. Otherwise, the UE 115 may return to sleep mode, which may result in greater power savings at the UE 115. In other examples, if the MBS session wake up indication bit 405-e corresponds to a second MBS and the UE 115 is not subscribed to the second MBS, the UE 115 may ignore the MBS session wake up indication bit 405-e.

The WUS format 402 may represent an alternative bit format for MBS WUS interpretation at a UE 115. In such examples, to support the alternative bit format, the base station 105 may use RRC signaling to configure the UE 115 with an offset field indicating DCI bit positions for each MBS indicated by the WUS format 402. Additionally or alternatively, an MBS-specific DRX ON Duration Timer may be defined (e.g., mbs-drx-onDurationTimer) to support the WUS format 402. In some examples, a group of MBSs may be mapped to one of the MBS session wake up indication bits 405. That is, the base station 105 may configure the WUS format 402 such that a single bit corresponds to multiple MBSs. In some examples, the MBS session wake up indication bits 405 may be configured through RRC signaling or may be generated through a hash function (e.g., as a function of an MBS session ID). If multiple MBS services are grouped together to use a common MBS C-DRX configuration, a common MBS WUS bit can be used by the UE 115 to determine whether to start a DRX active duration timer (e.g., mbs-drx-onDurationTimer) for the next DRX cycle.

Figure 4D:
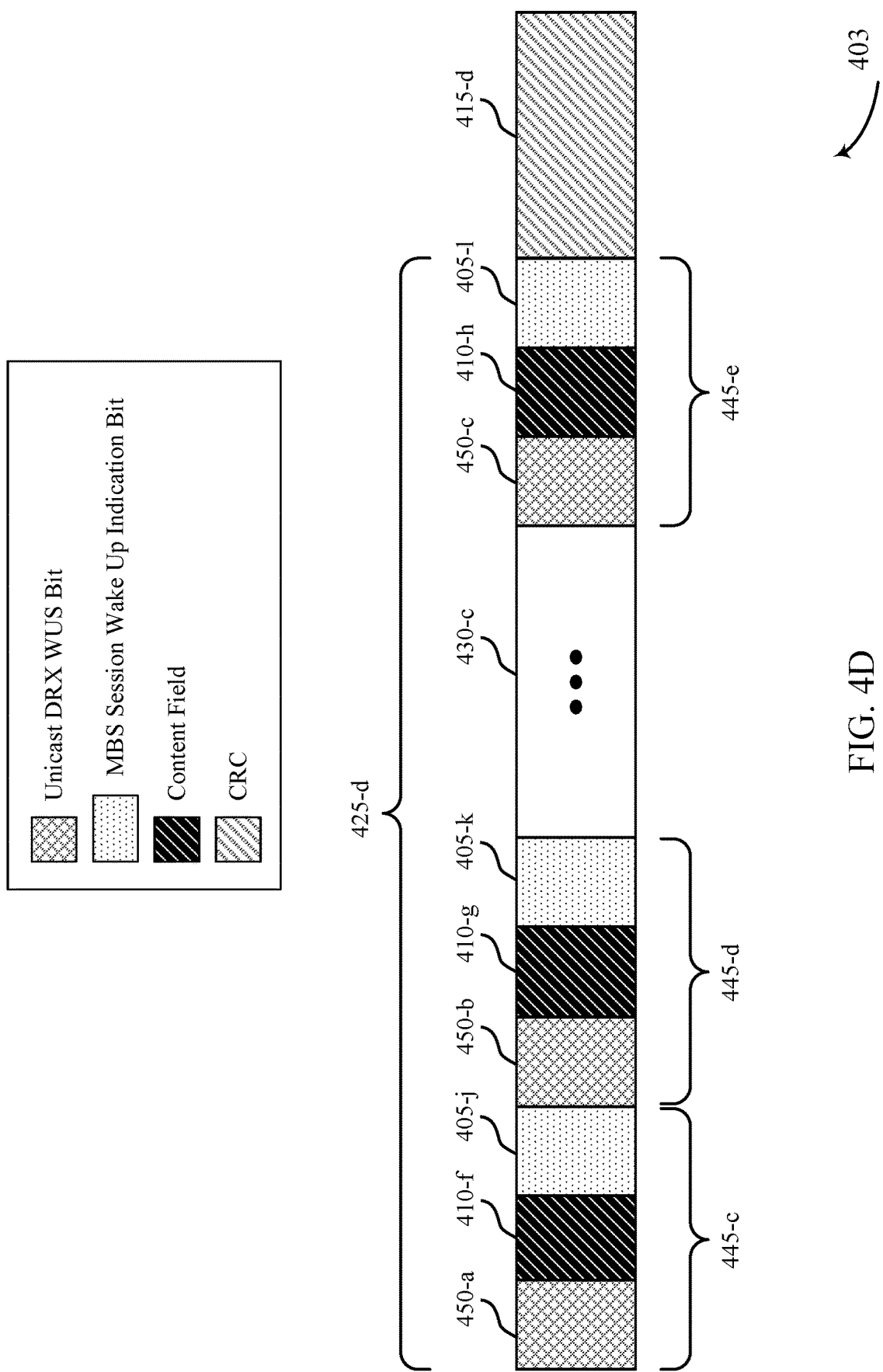

FIG. 4D illustrates a WUS format 403. The WUS format 403 may include unicast DRX WUS bits 450, content fields 410, MBS session wake up indication bits 405, UE-specific fields 445, UE-specific fields 430-c, and a CRC 415-d. The unicast DRX WUS bits 450, the content fields 410, the MBS session wake up indication bits 405, the UE-specific fields 445, and the UE-specific fields 430-c may correspond to a payload size 425-d of the WUS format 403, which may be an example of the first DCI format (e.g., DCI format 2_6). Each of the MBS session wake up indication bits 405 may correspond to a single MBS or a group of MBSs. If multiple MBSs are mapped to one MBS DRX cycle, a single bit may be used to indicate if at least one MBS is scheduled in the next MBS C-DRX active duration.

As an example, an MBS session wake up indication bit 405-j may correspond to a first MBS, an MBS session wake up indication bit 405-k may correspond to a second MBS, and an MBS session wake up indication bit 405-1 may correspond to a third MBS. In some examples, one of the MBS session wake up indication bits 405 may correspond to multiple MBSs. Each of the unicast DRX WUS bits 450 may correspond to a specific UE 115. For example, a unicast DRX WUS bit 450-a may correspond to a first UE 115, a unicast DRX WUS bit 450-b may correspond to a second UE 115, and a unicast DRX WUS bit 450-c may correspond to a third UE 115.

The UE-specific fields 445 may include unicast DRX WUS bits 450, content fields 410, and MBS session wake up indication bits 405. For example, UE-specific fields 445-c may include the unicast DRX WUS bit 450-a, a content field 410-f, and the MBS session wake up indication bit 405-j. Likewise, UE-specific fields 445-d may include the unicast DRX WUS bit 450-b, a content field 410-g, and the MBS session wake up indication bit 405-k, and UE-specific fields 445-e may include the unicast DRX WUS bit 450-c, a content field 410-h, and the MBS session wake up indication bit 405-1.

A UE 115 may receive an MBS WUS in accordance with the WUS format 403 and may determine whether to wake up for a subsequent MBS C-DRX active duration based on receiving the MBS WUS. To differentiate the WUS format 403 from other unicast WUS formats, the CRC 415-d may be scrambled with an MBS PS RNTI that is different from a unicast PS RNTI. Accordingly, the UE 115 may determine that the WUS format 403 corresponds to an MBS WUS based on using the MBS PS-RNTI to decode the CRC 415-d. After decoding the MBS WUS, the UE 115 may determine whether to wake up or return to sleep mode based on the UE-specific fields 445 corresponding to the UE 115.

As an example, if the UE-specific fields 445-e correspond to the UE 115, the UE 115 may determine whether to wake up or return to sleep mode based on the unicast DRX WUS bit 450-c, the content field 410-h, and the MBS session wake up indication bit 405-1 included in the UE-specific fields 445-e. If, for example, the unicast DRX WUS bit 450-c indicates a unicast transmission for the UE 115, the UE 115 may activate a DRX ON duration timer for the next DRX cycle. Additionally or alternatively, if the MBS session wake up indication bit 405-1 indicates a transmission for a first MBS to which the UE 115 is subscribed, the UE 115 may activate an MBS-specific DRX ON duration timer for the next MBS C-DRX cycle. In other words, if the MBS session wake up indication bit 405-1 is a 1, a MAC entity of the UE 115 may activate an MBS-specific DRX ON duration timer for the next DRX cycle. Otherwise, the UE 115 may return to sleep mode, which may result in greater power savings at the UE 115.

The content fields 410 may be used to control UE-specific SCell dormancy behavior, but may also be repurposed to indicate MBS WUS. This may enable the UE 115 to wake up during fewer WUS PDCCH monitoring occasions. In some examples, SCell group dormancy information may be indicated by a first number of bits (e.g., 6 bits), and a second number of bits may be used for MBS WUS. RRC signaling can be used to indicate whether the second number of bits are repurposed for MBS WUS or not.

The WUS format 400, the WUS format 401, the WUS format 402, and the WUS format 403 may support techniques for reduced power consumption at a UE 115 based on enabling the UE 115 to operate in a sleep mode for a longer duration. For example, the described techniques may enable a UE 115 to determine, based on receiving an MBS WUS from a base station 105 during a WUS monitoring occasion of an MBS C-DRX cycle, whether the UE 115 is subscribed to any MBSs with upcoming transmissions. If the UE 115 is not subscribed to any MBSs with upcoming transmissions, the UE 115 may remain in a C-DRX inactive mode for a longer duration, which may result in greater power savings at the UE 115.

In addition, the described techniques may enable a base station 105 to indicate a number of upcoming MBS transmissions with a single MBS WUS rather than multiple UE-specific WUSs. In other words, the base station 105 may transmit a single MBS WUS to a group of UEs 115 (e.g., UEs 115 in an MBS C-DRX cycle), as opposed to transmitting a UE-specific WUS to each UE 115 in the group of UEs 115. As a result, the described techniques may enable the base station 105 to indicate upcoming MBS transmissions with improved efficiency and reduced signaling overhead, among other benefits.

Figure 5:
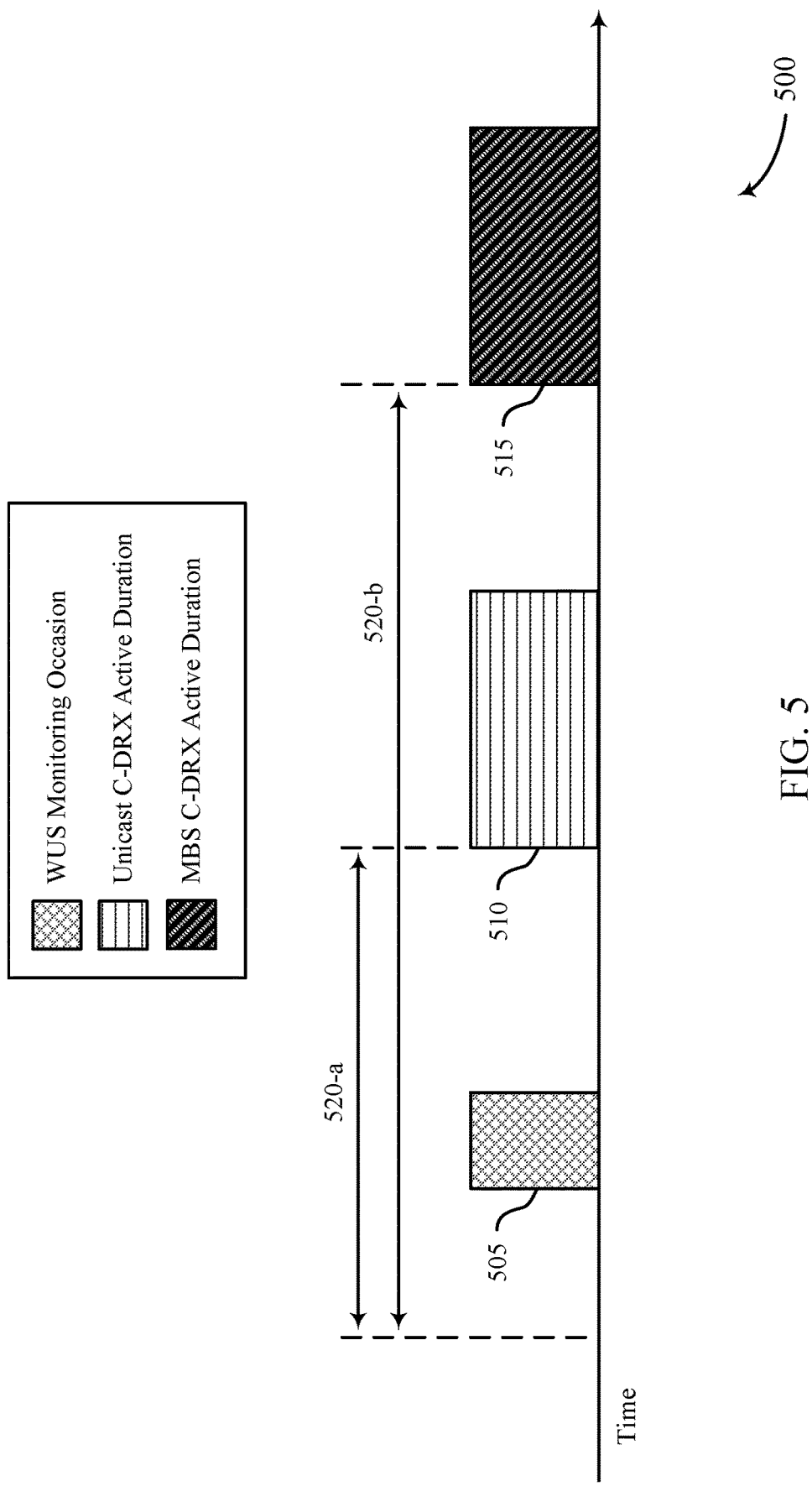
FIGS. 5 and 6 illustrate examples of communication schemes that support WUS for multicast group notification in accordance with aspects of the present disclosure.

FIG. 5 illustrates an example of a communication scheme 500 that supports WUS for multicast group notification in accordance with aspects of the present disclosure. The communication scheme 500 may implement or be implemented by aspects of the wireless communications system 100 or the wireless communications system 200. For example, the communication scheme 500 may be implemented by a UE 115 or a base station 105, which may be examples of corresponding devices described with reference to FIGS. 1 and 2. In the communication scheme 500, a UE 115 may determine whether to wake up during a unicast C-DRX active duration 510, an MBS C-DRX active duration 515, or both based on receiving control signaling from a base station 105 in a WUS monitoring occasion 505.

In some examples, a UE 115 may be configured with dual DRX configurations. For example, the UE 115 may be configured with a primary DRX configuration and a secondary DRX configuration. The primary DRX configuration may pertain to SCells in a first frequency range (e.g., FR1), whereas the secondary DRX configuration may pertain to SCells in a second frequency range (e.g., FR2). In some examples, the primary and secondary DRX configurations may be unicast DRX configurations. In other examples, the UE 115 may be configured with dual MBS DRX configurations. For dual MBS DRX configurations, the UE 115 may receive independent PDCCH WUS indications pertaining to the primary and secondary MBS DRX configurations.

In the example of FIG. 5, a UE 115 may be configured with a unicast C-DRX configuration and an MBS C-DRX configuration. The unicast C-DRX configuration may include a unicast C-DRX active duration 510 and a timing offset 520-a (e.g., ps-offset) associated with the unicast C-DRX active duration 510. Likewise, the MBS C-DRX configuration may include an MBS C-DRX active duration 515 and a timing offset 520-b (e.g., mbs-ps-offset) associated with the MBS C-DRX active duration 515.

The UE 115 may monitor a PDCCH for unicast transmissions from a base station 105 in the unicast C-DRX active duration 510. Similarly, the UE 115 may monitor a PDCCH, an MCCH, an MTCH, or a combination thereof for MBS transmissions from the base station in the MBS C-DRX active duration 515. The unicast C-DRX configuration, the MBS C-DRX configuration, or both may also include a WUS monitoring occasion 505. In some examples, the UE 115 may monitor for unicast WUSs in the WUS monitoring occasion 505. In other examples, the UE 115 may monitor for MBS WUSs in the WUS monitoring occasion.

The UE 115 may determine timing information (e.g., a start time, an end time) associated with the unicast C-DRX active duration 510 based on the timing offset 520-a. Likewise, the UE 115 may determine timing information associated with the MBS C-DRX active duration 515 based on the timing offset 520-b. In some examples, the unicast C-DRX active duration 510 and the MBS C-DRX active duration 515 may overlap in the time domain. In other words, a unicast DRX ON period and an MBS DRX ON period may partially or fully overlap in the time domain. If, for example, the UE 115 is configured to receive MBS WUSs (which may be common for all UEs 115) and UE-specific WUSs and the timing offsets 520 overlap in the time domain (e.g., if the unicast C-DRX active duration 510 overlaps with the MBS C-DRX active duration 515), the base station 105 may transmit a PDCCH DCI to the UE 115 indicating whether the UE 115 is to wake up in the unicast C-DRX active duration 510, the MBS C-DRX active duration 515, or both.

In some examples, if an MBS common frequency region (CFR) is configured, the UE 115 may monitor for an MBS WUS in a CORESET within the CFR. In other examples, if a WUS includes bits for unicast and MBS, the UE 115 may monitor for WUSs in a CORESET configured in a dedicated BWP, which may be same or larger than the MBS CFR. In some examples, WUS monitoring behavior of the UE 115 may be based on a capability of the UE 115. Additionally or alternatively, the UE 115 may use a Type-3 CSS to detect WUS for MBS or WUS for unicast and MBS. Alternatively, a different type (e.g., Type-x) CSS can be used to detect WUS for MBS, together with MBS group-common PDCCH. The monitoring priority of this CSS type may be determined based on search space set indexes of the CSS set and corresponding UE-specific search space (USS) sets.

The communication scheme 500 may support techniques for reduced power consumption at a UE 115 based on enabling the UE 115 to operate in a sleep mode for a longer duration. For example, the described techniques may enable a UE 115 to determine, based on receiving an MBS WUS from a base station 105 during a WUS monitoring occasion of an MBS C-DRX cycle, whether the UE 115 is subscribed to any MBSs with upcoming transmissions. If the UE 115 is not subscribed to any MBSs with upcoming transmissions, the UE 115 may remain in a C-DRX inactive mode for a longer duration, which may result in greater power savings at the UE 115.

The described techniques may also enable a base station 105 to indicate a number of upcoming MBS transmissions with a single MBS WUS rather than multiple UE-specific WUSs. In other words, the base station 105 may transmit a single MBS WUS to a group of UEs 115 (e.g., UEs 115 in an MBS C-DRX cycle), as opposed to transmitting a UE-specific WUS to each UE 115 in the group of UEs 115. As a result, the described techniques may enable the base station 105 to indicate upcoming MBS transmissions with improved efficiency and reduced signaling overhead, among other benefits.

Figure 6:
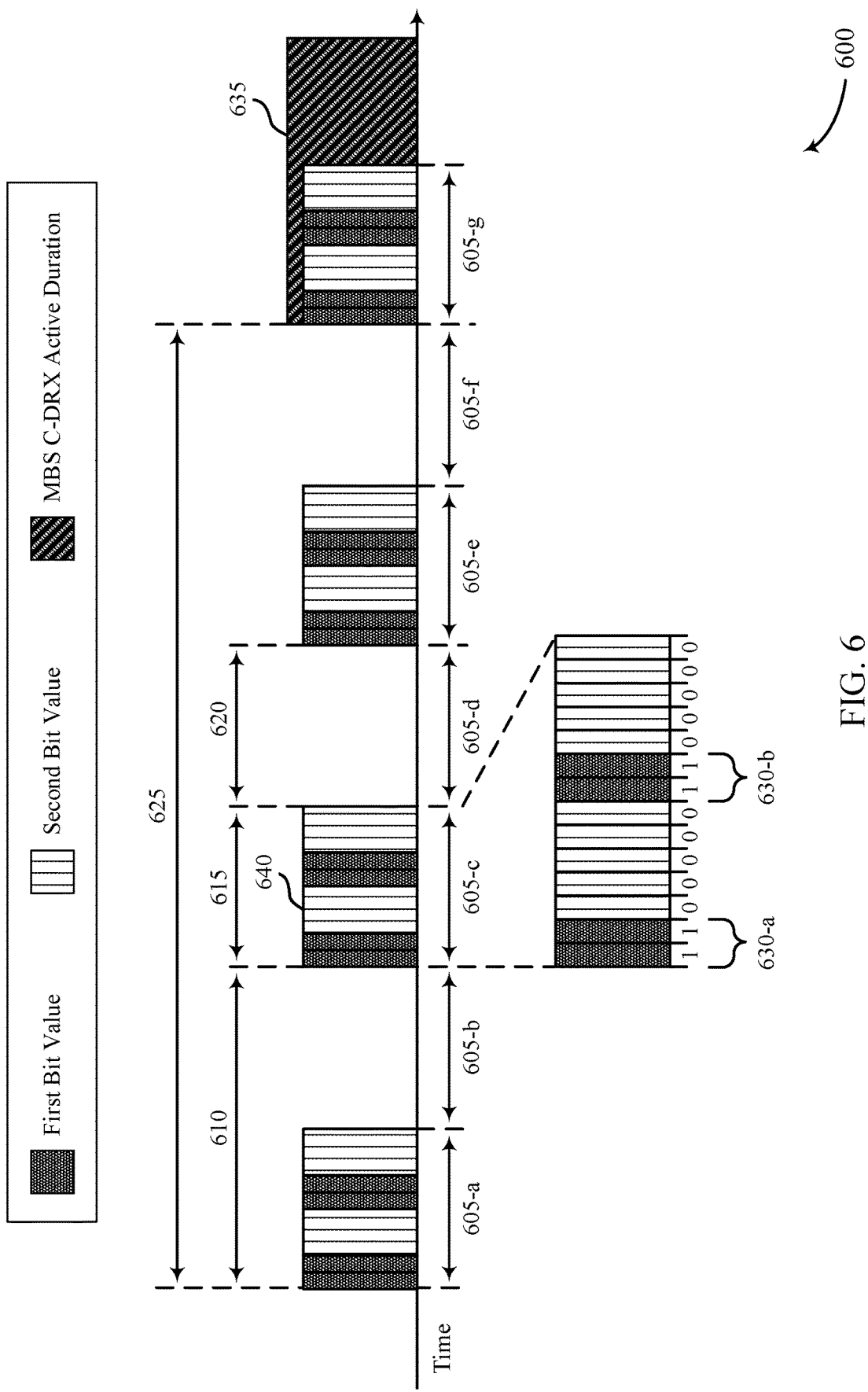

FIG. 6 illustrates an example of a communication scheme 600 that supports WUS for multicast group notification in accordance with aspects of the present disclosure. The communication scheme 600 may implement or be implemented by aspects of the wireless communications system 100 or the wireless communications system 200. For example, the communication scheme 600 may be implemented by a UE 115 or a base station 105, which may be examples of corresponding devices described with reference to FIGS. 1 and 2. In the communication scheme 600, a UE 115 may determine whether to wake up during an MBS C-DRX active duration 635 based on monitoring for MBS WUSs during one or more slots 605.

In the example of FIG. 6, a UE 115 may enter an MBS C-DRX cycle during one or more slots 605. For example, the UE 115 may monitor for MBS WUS in a slot 605-a, a slot 605-c, a slot 605-e, and a slot 605-g. The UE 115 may enter a low-power state (e.g., the UE 115 may refrain from monitoring for MBS WUS) in a slot 605-b, a slot 605-d, and a slot 605-f. In some examples, the UE 115 may be configured with a search space periodicity 610 between the MBS WUS monitoring occasions 640. In some examples, the MBS WUS monitoring occasions 640 may have a duration 615 equal to a slot (e.g., 14 symbols).

In some examples, the UE 115 may be configured with a time gap 620 (e.g., a minimum gap time) between MBS WUS monitoring occasions 640. The MBS WUS monitoring occasions 640 may include a PDCCH monitoring occasion 630-a and a PDCCH monitoring occasion 630-b. In some examples, the UE 115 may receive a first bit value (e.g., 1) in the PDCCH monitoring occasions 630, and may receive a second bit value (e.g., 0) in other PDCCH monitoring occasions. In some cases, the UE 115 may refrain from monitoring for MBS WUS in the other PDCCH monitoring occasions. The PDCCH monitoring occasions 630 may include a one symbol CORESET within a duration.

For each MBS search space set configured for monitoring a DCI format associated with MBS WUS (e.g., DCI format 2_6 or a modified DCI format), the UE 115 may monitor PDCCH occasions in a first duration starting at or after a timing offset 625 (e.g., mbs-ps-Offset) and ending before a slot 605-g in which a DRX active duration timer (e.g., mbs-drx-onDurationTimer) is to start. A time gap 620 may be defined as a time duration before the slot 605-g in which the DRX activation timer is to start (e.g., in which the UE 115 may not monitor the DCI format associated with MBS WUS). If the UE 115 detects the MBS DCI format in at least one of the MBS WUS monitoring occasions 640, the UE may operate according to an indication in an MBS service-specific field of the MBS DCI format.

Alternatively, if no MBS DCI format is detected upon monitoring MBS WUS monitoring occasions (e.g., if the base station 105 is operating in a discontinuous transmission (DTX) mode or if the UE 115 is unable to successfully receive an MBS WUS), a higher layer parameter (e.g., mbs-ps-WakeupOrNot) may indicate whether the UE 115 is to start the MBS C-DRX activation timer (e.g., MBS drx-onDurationTimer) for the next MBS DRX cycle. If the higher layer parameter (e.g., mbs-ps-WakeupOrNot) is not provided, the UE 115 may not start the MBS C-DRX active duration timer (e.g., mbs-drx-onDurationTimer) for the next MBS C-DRX cycle.

In some cases, if both short and long DRX cycles are configured for the MBS C-DRX configuration, the UE 115 may selectively monitor for the MBS DCI format during long DRX cycles. That is, the UE 115 may refrain from monitoring for the MBS DCI format during short DRX cycles. In such cases, the MBS C-DRX active duration timer (e.g., mbs-drx-onDurationTimer) may be activated for all short DRX cycles. In some cases, the UE 115 may refrain from monitoring for the MBS DCI format during the MBS C-DRX active duration 635. The UE 115 may start the MBS C-DRX active duration timer for the next MBS DRX cycle if, for example, a current CFR of the UE 115 is not configured for monitoring WUS DCI formats.

In some cases, the UE 115 may refrain from monitoring PDCCH for MBS DCI formats (e.g., for MBS WUS) due to an overlap between MBS WUS monitoring occasions and SSBs or other PDCCH occasions with different quasi-co-location (QCL)-TypeD properties. The UE 115 may also refrain from monitoring PDCCH for MBS DCI formats due to measurement gaps, BWP switching delays or if there are no MBS WUS monitoring occasions configured for an MBS DRX cycle, among other examples.

The communication scheme 600 may support techniques for reduced power consumption at a UE 115 based on enabling the UE 115 to operate in a sleep mode for a longer duration. For example, the described techniques may enable a UE 115 to determine, based on receiving an MBS WUS from a base station 105 during a WUS monitoring occasion of an MBS C-DRX cycle, whether the UE 115 is subscribed to any MBSs with upcoming transmissions. If the UE 115 is not subscribed to any MBSs with upcoming transmissions, the UE 115 may remain in a C-DRX inactive mode for a longer duration, which may result in greater power savings at the UE 115.

Additionally, the described techniques may enable a base station 105 to indicate a number of upcoming MBS transmissions with a single MBS WUS rather than multiple UE-specific WUSs. In other words, the base station 105 may transmit a single MBS WUS to a group of UEs 115 (e.g., UEs 115 in an MBS C-DRX cycle), as opposed to transmitting a UE-specific WUS to each UE 115 in the group of UEs 115. As a result, the described techniques may enable the base station 105 to indicate upcoming MBS transmissions with improved efficiency and reduced signaling overhead, among other benefits.

Figure 7:
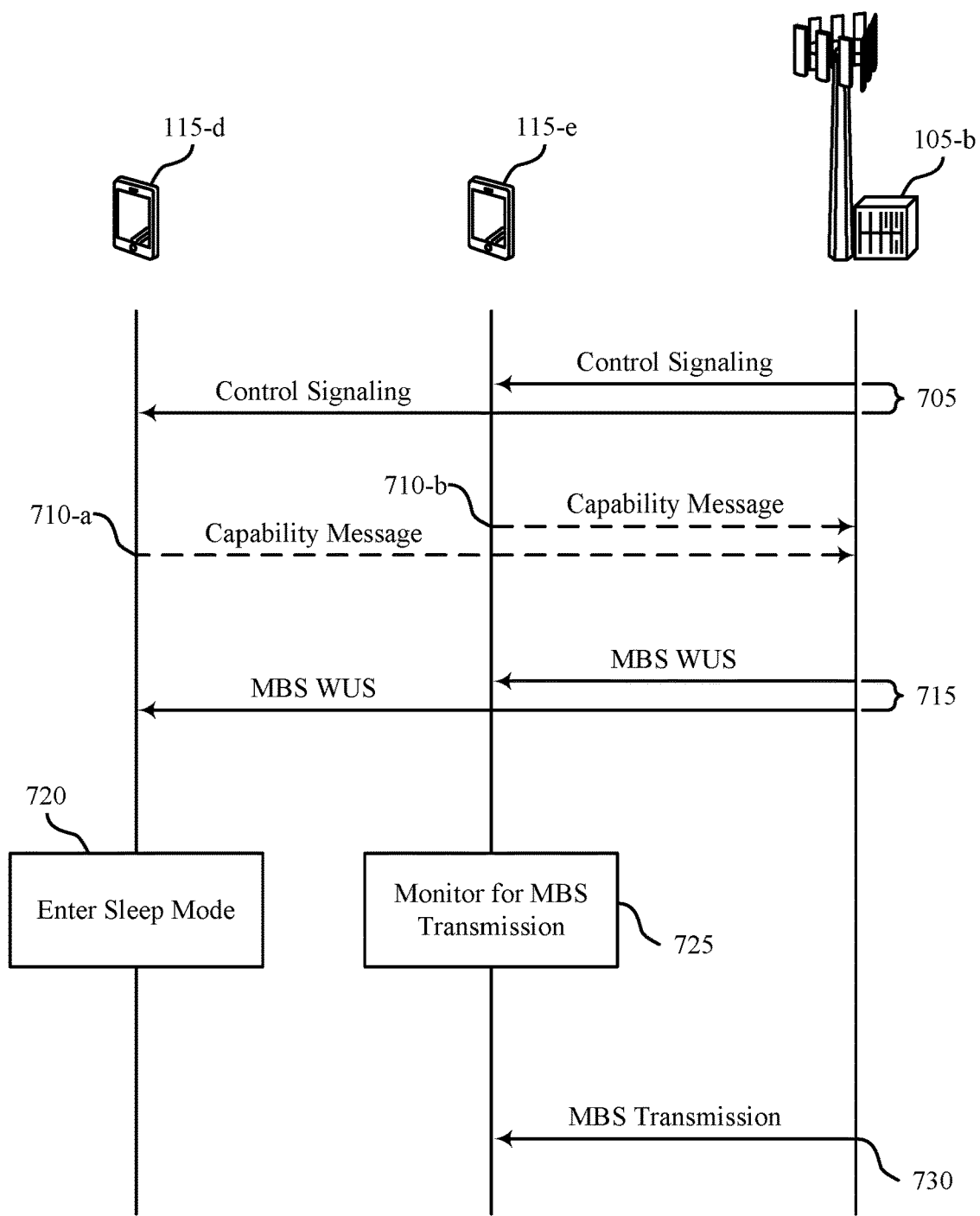
FIG. 7 illustrates an example of a process flow that supports WUS for multicast group notification in accordance with aspects of the present disclosure.

FIG. 7 illustrates an example of a process flow 700 that supports WUS for multicast group notification in accordance with aspects of the present disclosure. The process flow 700 may implement or be implemented by aspects of the wireless communications system 100 or the wireless communications system 200. For example, process flow 700 may include a UE 115-d, a UE 115-e, and a base station 105-b, which may be examples of corresponding devices described with reference to FIGS. 1 and 2. In the following description of the process flow 700, operations between the base station 105-b and the UEs 115 may be performed in a different order or at a different time than as shown. Additionally or alternatively, some operations may be omitted from the process flow 700, and other operations may be added to the process flow 700.

In some examples, the base station 105-b may configure the UEs 115 with one or more C-DRX cycles. For example, the base station 105-b may configure the UE 115-d with a unicast C-DRX cycle and an MBS C-DRX cycle. In some examples, the base station 105-b may configure the UEs 115 with a group-common MBS C-DRX configuration. In other examples, the base station 105-b may configure the UEs 115 with multiple different MBS C-DRX cycles. For example, the base station 105-b may configure the UE 115-e with a primary MBS C-DRX cycle and a secondary MBS C-DRX cycle. Each of the one or more C-DRX cycles may include active durations, inactive durations, and WUS monitoring occasions, as described with reference to FIGS. 1-6. In some examples, if the UE 115-d is configured with a first C-DRX cycle and a second C-DRX cycle and a first active duration of the first C-DRX cycle overlaps with a second active duration of the second C-DRX cycle, the UE 115-d may determine whether to wake up for the first active duration, the second active duration, or both based on receiving DCI from the base station 105-b.

At 705, the base station 105-b may transmit control signaling to the UEs 115. The control signaling may include RRC signaling and may indicate one or more parameters pertaining to an MBS WUS format. For example, the control signaling may indicate a PDCCH format, a bit offset for the PDCCH format, an MBS DRX active duration timer, a timing offset between an MBS WUS monitoring occasion and an MBS DRX active duration, or a combination thereof. In some examples, the UE 115-d may transmit a capability message to the base station 105-b at 710-a. Additionally or alternatively, the UE 115-e may transmit a capability message to the base station 105-b at 710-b. The capability messages may indicate whether the UEs 115 are capable of receiving MBS WUSs.

At 715, the base station 105-b may transmit an MBS WUS to the UEs 115 in accordance with the control signaling. The base station 105-b may transmit the MBS WUS to the UEs 115 during a WUS monitoring occasion of an MBS C-DRX cycle. In some examples, the UEs 115 may receive the MBS WUS based on monitoring one or more CORESETs in a broadcast CFR. In other examples, the UEs 115 may receive the MBS WUS based on monitoring one or more CSS sets. In some examples, if the UEs 115 are configured with multiple C-DRX cycles, the UEs 115 may receive multiple MBS WUSs corresponding to the multiple C-DRX cycles. In other examples, if the UEs 115 are configured with a group-common C-DRX configuration, the UEs 115 may receive a common (e.g., shared) MBS WUS.

In some examples, the UEs 115 may decode the MBS WUS using a RNTI associated with the MBS WUS format. The MBS WUS may include a number of bits that correspond to a set of MBSs. The UEs 115 may identify, based on the control signaling, a mapping between the number of bits and the set of MBSs. In some examples, if the UE 115-e is subscribed to a first MBS in the set of MBSs and the MBS WUS indicates a transmission scheduled for the first MBS, the UE 115-e may activate a DRX ON duration timer. Upon activating the DRX ON duration timer, the UE 115-e may wake up to monitor for the transmission.

At 720, the UE 115-d may enter a sleep mode during a subsequent C-DRX active duration based on receiving the MBS WUS from the base station 105-b. For example, if the UE 115-d determines that the UE 115-d is not subscribed to any MBSs with transmissions scheduled in the subsequent C-DRX active duration, the UE 115-d may remain in a C-DRX inactive state (e.g., a low-power state) during the subsequent C-DRX active duration. At 725, the UE 115-e may monitor for an MBS transmission from the base station 105-b during the subsequent C-DRX active duration based on receiving the MBS WUS from the base station 105-b. For example, if the UE 115-e determines that the UE 115-e is subscribed to an MBS with a transmission scheduled in the subsequent C-DRX active duration, the UE 115-e may wake up to monitor for the transmission during the subsequent C-DRX active duration in accordance with the MBS WUS. At 730, the UE 115-e may receive the MBS transmission from the base station 105-b in accordance with the MBS WUS.

The process flow 700 may support techniques for reduced power consumption at the UEs 115 based on enabling the UEs 115 to operate in a sleep mode for a longer duration. For example, the described techniques may enable the UEs 115 to determine, based on receiving an MBS WUS from the base station 105-b during a WUS monitoring occasion of an MBS C-DRX cycle, whether the UEs 115 are subscribed to any MBSs with upcoming transmissions. If the UEs 115 are not subscribed to any MBSs with upcoming transmissions, the UEs 115 may remain in a C-DRX inactive mode for a longer duration, which may result in greater power savings at the UEs 115.

The described techniques may also enable the base station 105-b to indicate a number of upcoming MBS transmissions with a single MBS WUS rather than multiple UE-specific WUSs. In other words, the base station 105-b may transmit a single MBS WUS to the UEs 115, as opposed to transmitting a UE-specific WUS to the UE 115-*d* and the UE 115-*e*. As a result, the described techniques may enable the base station 105-*b* to indicate upcoming MBS transmissions with improved efficiency and reduced signaling overhead, among other benefits.

Figure 8:
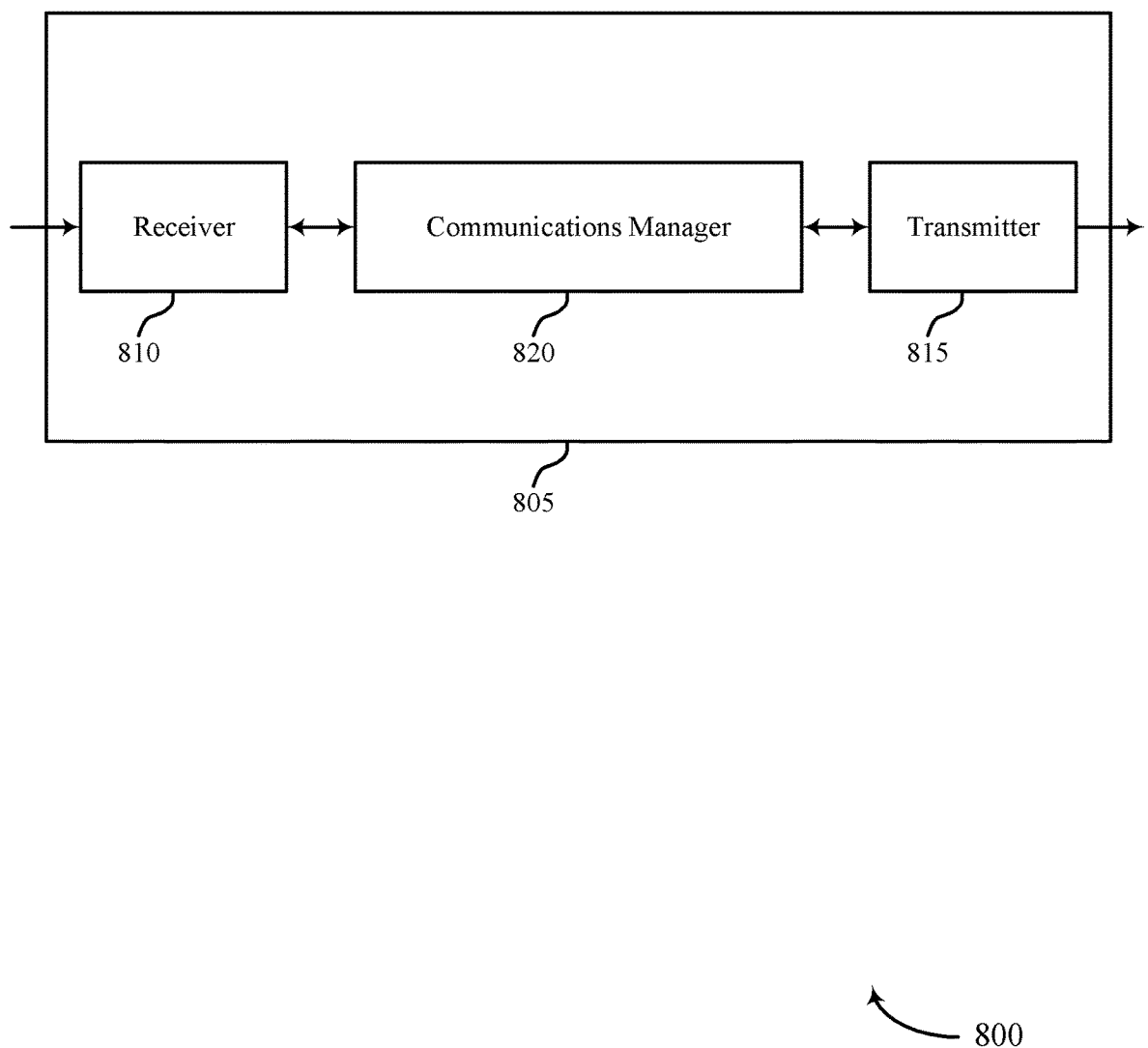
FIGS. 8 and 9 show block diagrams of devices that support WUS for multicast group notification in accordance with aspects of the present disclosure.

FIG. 8 shows a block diagram 800 of a device 805 that supports WUS for multicast group notification in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to WUS for multicast group notification). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to WUS for multicast group notification). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of WUS for multicast group notification as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at the device 805 in accordance with examples as disclosed herein. For example, the communications manager 820 may be configured as or otherwise support a means for receiving, from a base station, control signaling that indicates one or more parameters pertaining to a multicast or broadcast WUS format. The communications manager 820 may be configured as or otherwise support a means for receiving, from the base station during a WUS monitoring occasion of a C-DRX cycle, a multicast or broadcast WUS in accordance with the control signaling. The communications manager 820 may be configured as or otherwise support a means for monitoring for a multicast or broadcast transmission from the base station during an active duration of the C-DRX cycle based on the multicast or broadcast WUS.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for reduced power consumption based on enabling the device 805 to operate in a sleep mode for a longer duration. For example, the described techniques may enable the device 805 to determine, based on receiving an MBS WUS from a base station 105 during a WUS monitoring occasion of a C-DRX cycle, whether the device 805 is subscribed to any MBSs with upcoming transmissions. If the device 805 is not subscribed to any MBSs with upcoming transmissions, the device 805 may remain in a C-DRX inactive mode (e.g., a sleep mode) for a longer duration, which may result in greater power savings at the device 805.

Figure 9:
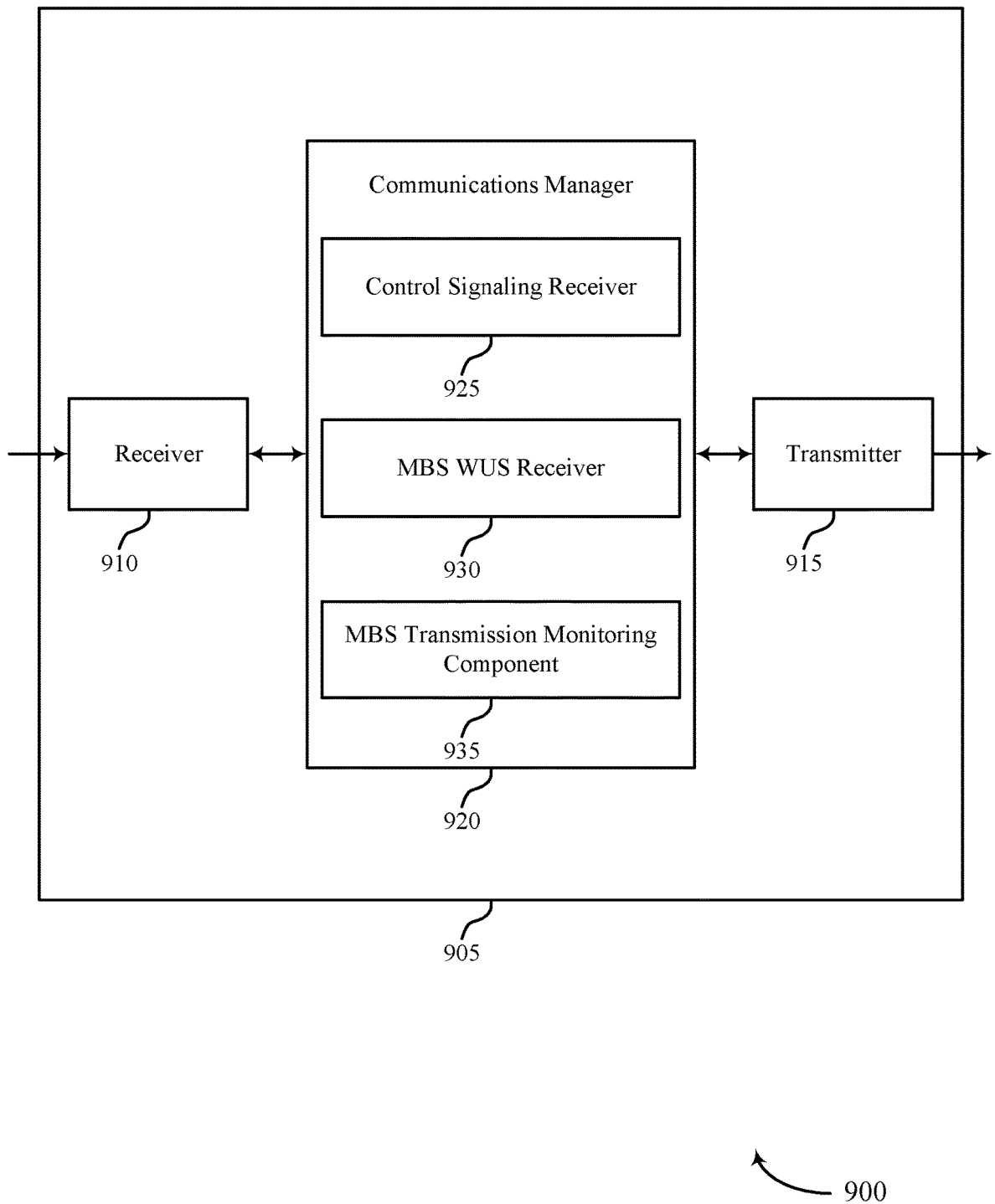

FIG. 9 shows a block diagram 900 of a device 905 that supports WUS for multicast group notification in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to WUS for multicast group notification). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to WUS for multicast group notification). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of WUS for multicast group notification as described herein. For example, the communications manager 920 may include a control signaling receiver 925, an MBS WUS receiver 930, an MBS transmission monitoring component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at the device 905 in accordance with examples as disclosed herein. The control signaling receiver 925 may be configured as or otherwise support a means for receiving, from a base station, control signaling that indicates one or more parameters pertaining to a multicast or broadcast WUS format. The MBS WUS receiver 930 may be configured as or otherwise support a means for receiving, from the base station during a WUS monitoring occasion of a C-DRX cycle, a multicast or broadcast WUS in accordance with the control signaling. The MBS transmission monitoring component 935 may be configured as or otherwise support a means for monitoring for a multicast or broadcast transmission from the base station during an active duration of the C-DRX cycle based on the multicast or broadcast WUS.

Figure 10:
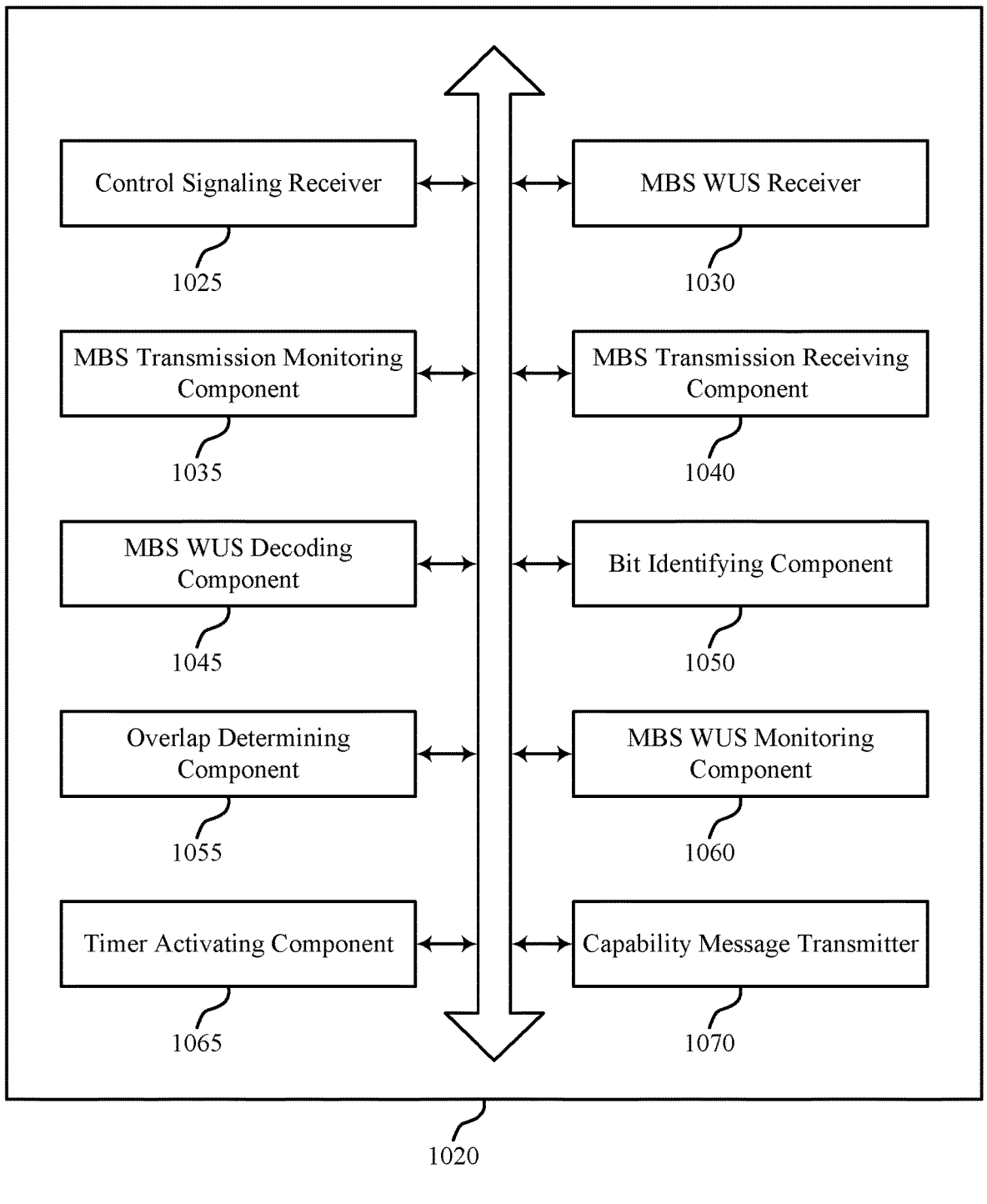
FIG. 10 shows a block diagram of a communications manager that supports WUS for multicast group notification in accordance with aspects of the present disclosure.

FIG. 10 shows a block diagram 1000 of a communications manager 1020 that supports WUS for multicast group notification in accordance with aspects of the present disclosure. The communications manager 1020 may be an example of aspects of a communications manager 820, a communications manager 920, or both, as described herein. The communications manager 1020, or various components thereof, may be an example of means for performing various aspects of WUS for multicast group notification as described herein. For example, the communications manager 1020 may include a control signaling receiver 1025, an MBS WUS receiver 1030, an MBS transmission monitoring component 1035, an MBS transmission receiving component 1040, an MBS WUS decoding component 1045, a bit identifying component 1050, an overlap determining component 1055, an MBS WUS monitoring component 1060, a timer activating component 1065, a capability message transmitter 1070, or any combination thereof. Each of these components may communicate, directly or indirectly, with one another (e.g., via one or more buses).

The communications manager 1020 may support wireless communications at the device 1005 in accordance with examples as disclosed herein. The control signaling receiver 1025 may be configured as or otherwise support a means for receiving, from a base station, control signaling that indicates one or more parameters pertaining to a multicast or broadcast WUS format. The MBS WUS receiver 1030 may be configured as or otherwise support a means for receiving, from the base station during a WUS monitoring occasion of a C-DRX cycle, a multicast or broadcast WUS in accordance with the control signaling. The MBS transmission monitoring component 1035 may be configured as or otherwise support a means for monitoring for a multicast or broadcast transmission from the base station during an active duration of the C-DRX cycle based on the multicast or broadcast WUS.

In some examples, the MBS transmission receiving component 1040 may be configured as or otherwise support a means for receiving the multicast or broadcast transmission from the base station during the active duration based on the monitoring.

In some examples, the MBS WUS decoding component 1045 may be configured as or otherwise support a means for decoding the multicast or broadcast WUS based on a RNTI associated with the multicast or broadcast WUS format, where monitoring for the multicast or broadcast transmission is based on decoding the multicast or broadcast WUS.

In some examples, to support receiving the control signaling, the control signaling receiver 1025 may be configured as or otherwise support a means for receiving, from the base station, control signaling that indicates a PDCCH format, a bit offset field for the PDCCH format, a timing parameter specific to the C-DRX cycle, a timing offset between the multicast or broadcast WUS and the multicast or broadcast transmission, or a combination thereof.

In some examples, the control signaling receiver 1025 may be configured as or otherwise support a means for receiving, from the base station, a message indicating a primary multicast or broadcast C-DRX configuration associated with the C-DRX cycle of the device 1005, a secondary multicast or broadcast C-DRX configuration associated with a second C-DRX cycle of the device 1005, or both, where receiving the multicast or broadcast WUS from the base station is based on the message. In some examples, the C-DRX cycle may include a group-common C-DRX cycle.

In some examples, the bit identifying component 1050 may be configured as or otherwise support a means for identifying, based on the multicast or broadcast WUS format, a set of bits in the multicast or broadcast WUS that correspond to a set of MBSs, where the device 1005 is subscribed to at least one MBS in the set of MBSs.

In some examples, the MBS transmission monitoring component 1035 may be configured as or otherwise support a means for determining, based on the set of bits, that one or more transmissions are scheduled for the at least one MBS in the active duration, where monitoring for the multicast or broadcast transmission is based on the determining.

In some examples, the bit identifying component 1050 may be configured as or otherwise support a means for identifying a mapping between the set of bits and the set of MBSs based on a hash function and a multicast or broadcast session identifier, where determining that one or more transmissions are scheduled for the at least one MBS is based on the mapping.

In some examples, the bit identifying component 1050 may be configured as or otherwise support a means for determining, based on the mapping, that a first bit in the set of bits corresponds to two or more MBSs in the set of MBSs.

In some examples, to support receiving the control signaling, the control signaling receiver 1025 may be configured as or otherwise support a means for receiving, from the base station, RRC signaling that indicates the one or more parameters pertaining to the multicast or broadcast WUS format.

In some examples, the overlap determining component 1055 may be configured as or otherwise support a means for determining that at least a part of the active duration overlaps with a second active duration of a second C-DRX cycle. In some examples, the control signaling receiver 1025 may be configured as or otherwise support a means for receiving, from the base station, DCI indicating whether the device 1005 is to monitor for transmissions in the active duration, the second active duration, or both, where monitoring for the multicast or broadcast transmission is based on the DCI.

In some examples, to support receiving the multicast or broadcast WUS, the MBS WUS monitoring component 1060 may be configured as or otherwise support a means for monitoring one or more CORESETs in a CFR based on the control signaling. In some examples, to support receiving the multicast or broadcast WUS, the MBS WUS receiver 1030 may be configured as or otherwise support a means for receiving the multicast or broadcast WUS from the base station based on monitoring the one or more CORESETs.

In some examples, to support receiving the multicast or broadcast WUS, the MBS WUS monitoring component 1060 may be configured as or otherwise support a means for monitoring one or more CSSs in accordance with the control signaling. In some examples, to support receiving the multicast or broadcast WUS, the MBS WUS receiver 1030 may be configured as or otherwise support a means for receiving the multicast or broadcast WUS from the base station based on monitoring the one or more CSSs.

In some examples, the MBS WUS receiver 1030 may be configured as or otherwise support a means for receiving, from the base station during a WUS monitoring occasion of the second C-DRX cycle, a second multicast or broadcast WUS in accordance with the secondary multicast or broadcast C-DRX configuration.

In some examples, the bit identifying component 1050 may be configured as or otherwise support a means for identifying, based on the multicast or broadcast WUS format, one or more bits in the multicast or broadcast WUS that indicate dormancy information pertaining to a set of SCells.

In some examples, the timer activating component 1065 may be configured as or otherwise support a means for activating a DRX timer based on receiving the multicast or broadcast WUS, where monitoring for the multicast or broadcast transmission is based on the DRX timer.

In some examples, the capability message transmitter 1070 may be configured as or otherwise support a means for transmitting, to the base station, a capability message indicating a capability of the device 1005 to receive multicast or broadcast WUSs, where receiving the multicast or broadcast WUS is based on the capability message.

Figure 11:
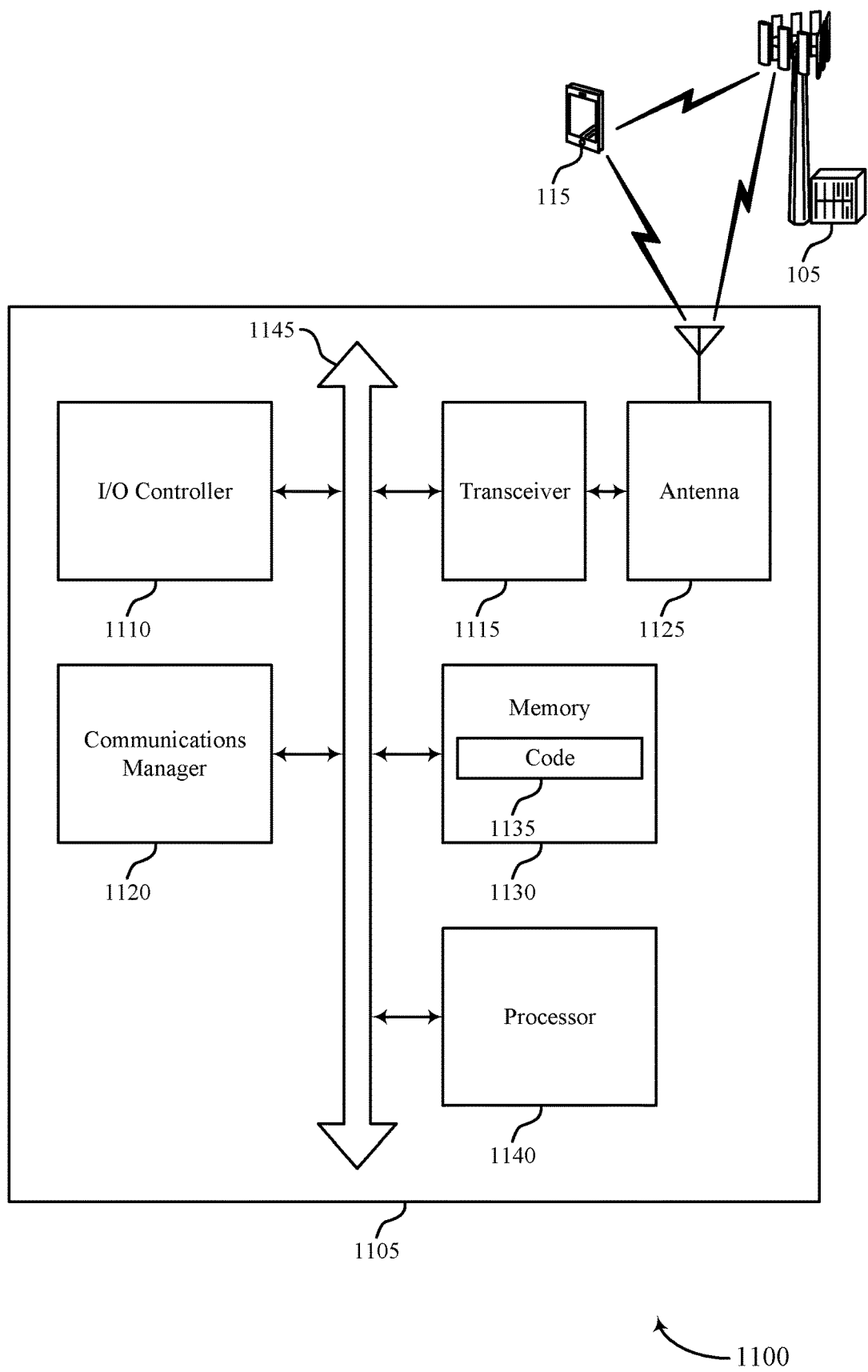
FIG. 11 shows a diagram of a system including a device that supports WUS for multicast group notification in accordance with aspects of the present disclosure.

FIG. 11 shows a diagram of a system 1100 including a device 1105 that supports WUS for multicast group notification in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting WUS for multicast group notification). For example, the device 1105 or a component of the device 1105 may include a processor 1140 and memory 1130 coupled to the processor 1140, the processor 1140 and memory 1130 configured to perform various functions described herein.

The communications manager 1120 may support wireless communications at the device 1105 in accordance with examples as disclosed herein. For example, the communications manager 1120 may be configured as or otherwise support a means for receiving, from a base station, control signaling that indicates one or more parameters pertaining to a multicast or broadcast WUS format. The communications manager 1120 may be configured as or otherwise support a means for receiving, from the base station during a WUS monitoring occasion of a C-DRX cycle, a multicast or broadcast WUS in accordance with the control signaling. The communications manager 1120 may be configured as or otherwise support a means for monitoring for a multicast or broadcast transmission from the base station during an active duration of the C-DRX cycle based on the multicast or broadcast WUS.

By including or configuring the communications manager 1120 in accordance with examples as described herein, the device 1105 may support techniques for improved C-DRX efficiency. For example, the described techniques may enable the device 1105 to determine whether the device 1105 is subscribed to any MBSs with upcoming transmissions based on receiving an MBS WUS from a base station 105 during a WUS monitoring occasion of a C-DRX cycle. If the device 1105 is not scheduled to receive any multicast or broadcast transmissions from the base station 105 (e.g., if the device 1105 is not subscribed to any MBSs with scheduled transmissions), the device 1105 may refrain from waking up during a subsequent active duration of the C-DRX cycle, which may improve the efficiency of the C-DRX cycle.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of WUS for multicast group notification as described herein, or the processor 1140 and the memory 1130 may be otherwise configured to perform or support such operations.

Figure 12:
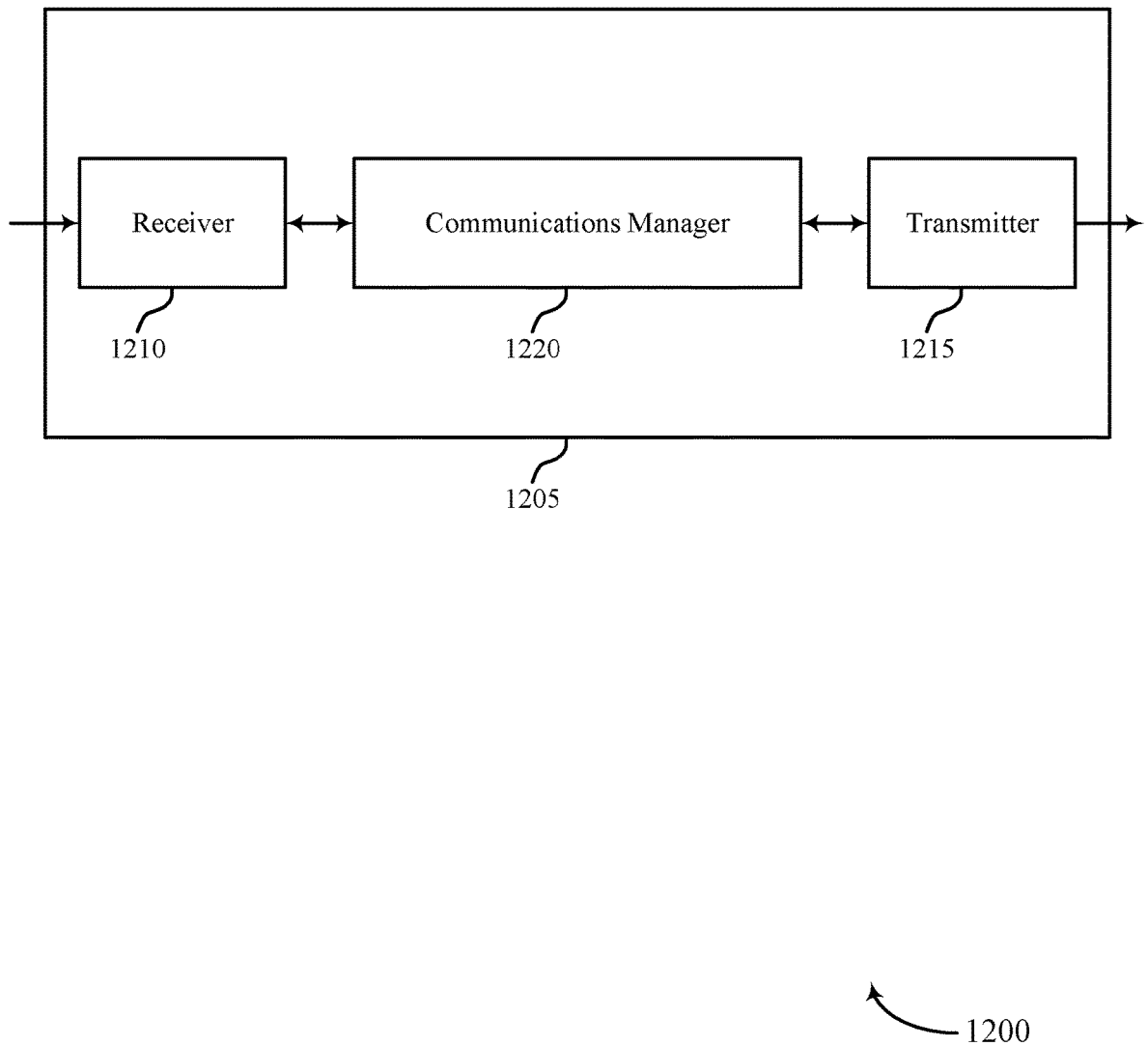
FIGS. 12 and 13 show block diagrams of devices that support WUS for multicast group notification in accordance with aspects of the present disclosure.

FIG. 12 shows a block diagram 1200 of a device 1205 that supports WUS for multicast group notification in accordance with aspects of the present disclosure. The device 1205 may be an example of aspects of a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to WUS for multicast group notification). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to WUS for multicast group notification). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of WUS for multicast group notification as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at the device 1205 in accordance with examples as disclosed herein. For example, the communications manager 1220 may be configured as or otherwise support a means for transmitting control signaling that indicates one or more parameters pertaining to a multicast or broadcast WUS format. The communications manager 1220 may be configured as or otherwise support a means for transmitting, to a group of UEs in a C-DRX cycle, a multicast or broadcast WUS in accordance with the control signaling. The communications manager 1220 may be configured as or otherwise support a means for transmitting a multicast or broadcast transmission to the group of UEs in accordance with the multicast or broadcast WUS.

By including or configuring the communications manager 1220 in accordance with examples as described herein, the device 1205 (e.g., a processor controlling or otherwise coupled to the receiver 1210, the transmitter 1215, the communications manager 1220, or a combination thereof) may support techniques for reduced processing and more efficient utilization of communication resources, among other benefits. For example, the described techniques may enable the device 1205 to indicate upcoming MBS transmissions with lower signaling overhead and fewer processing resources based on transmitting an MBS WUS to one or more UEs 115 in a C-DRX cycle.

Figure 13:
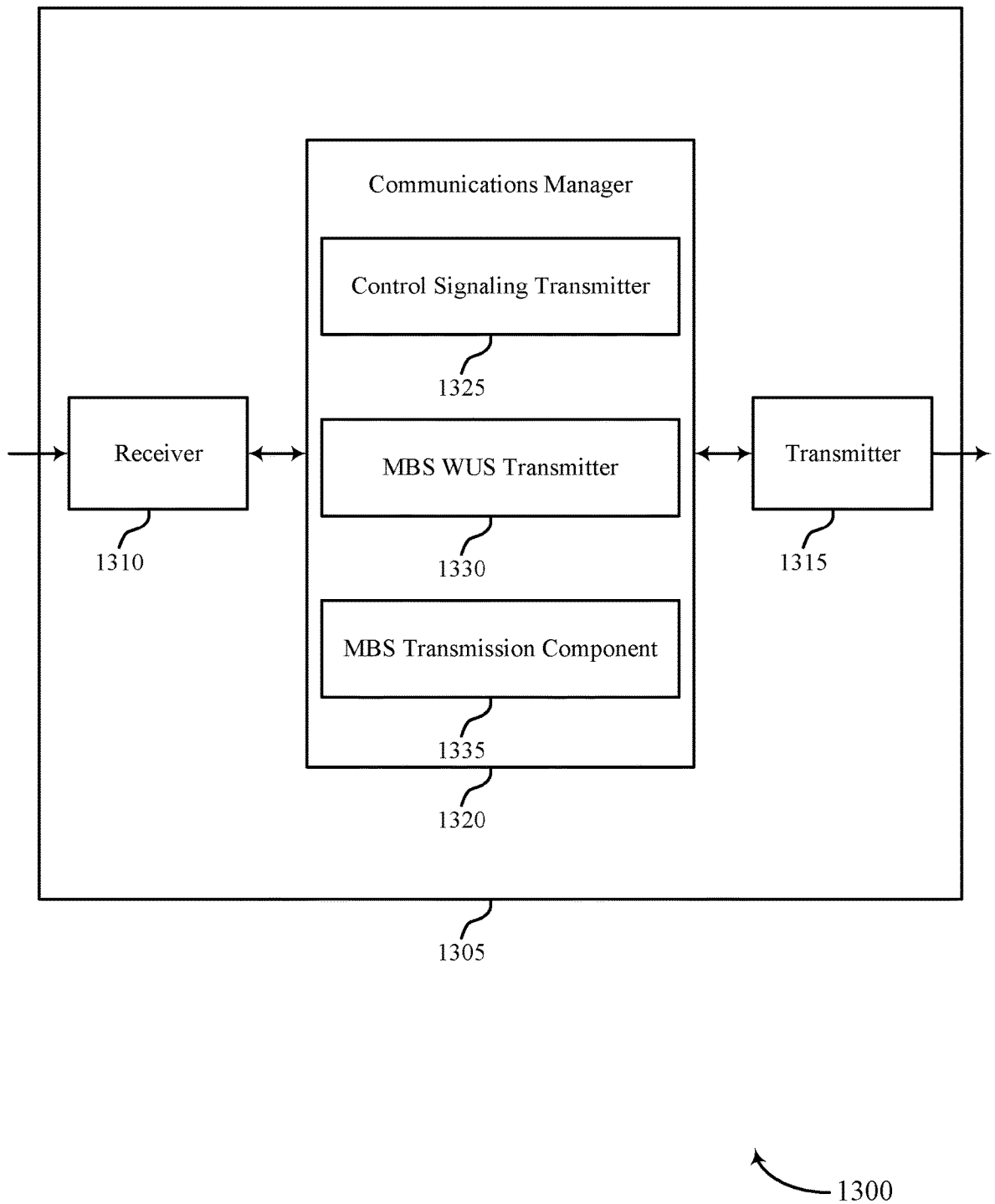

FIG. 13 shows a block diagram 1300 of a device 1305 that supports WUS for multicast group notification in accordance with aspects of the present disclosure. The device 1305 may be an example of aspects of a device 1205 or a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to WUS for multicast group notification). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to WUS for multicast group notification). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of WUS for multicast group notification as described herein. For example, the communications manager 1320 may include a control signaling transmitter 1325, an MBS WUS transmitter 1330, an MBS transmission component 1335, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communications at the device 1305 in accordance with examples as disclosed herein. The control signaling transmitter 1325 may be configured as or otherwise support a means for transmitting control signaling that indicates one or more parameters pertaining to a multicast or broadcast WUS format. The MBS WUS transmitter 1330 may be configured as or otherwise support a means for transmitting, to a group of UEs in a C-DRX cycle, a multicast or broadcast WUS in accordance with the control signaling. The MBS transmission component 1335 may be configured as or otherwise support a means for transmitting a multicast or broadcast transmission to the group of UEs in accordance with the multicast or broadcast WUS.

Figure 14:
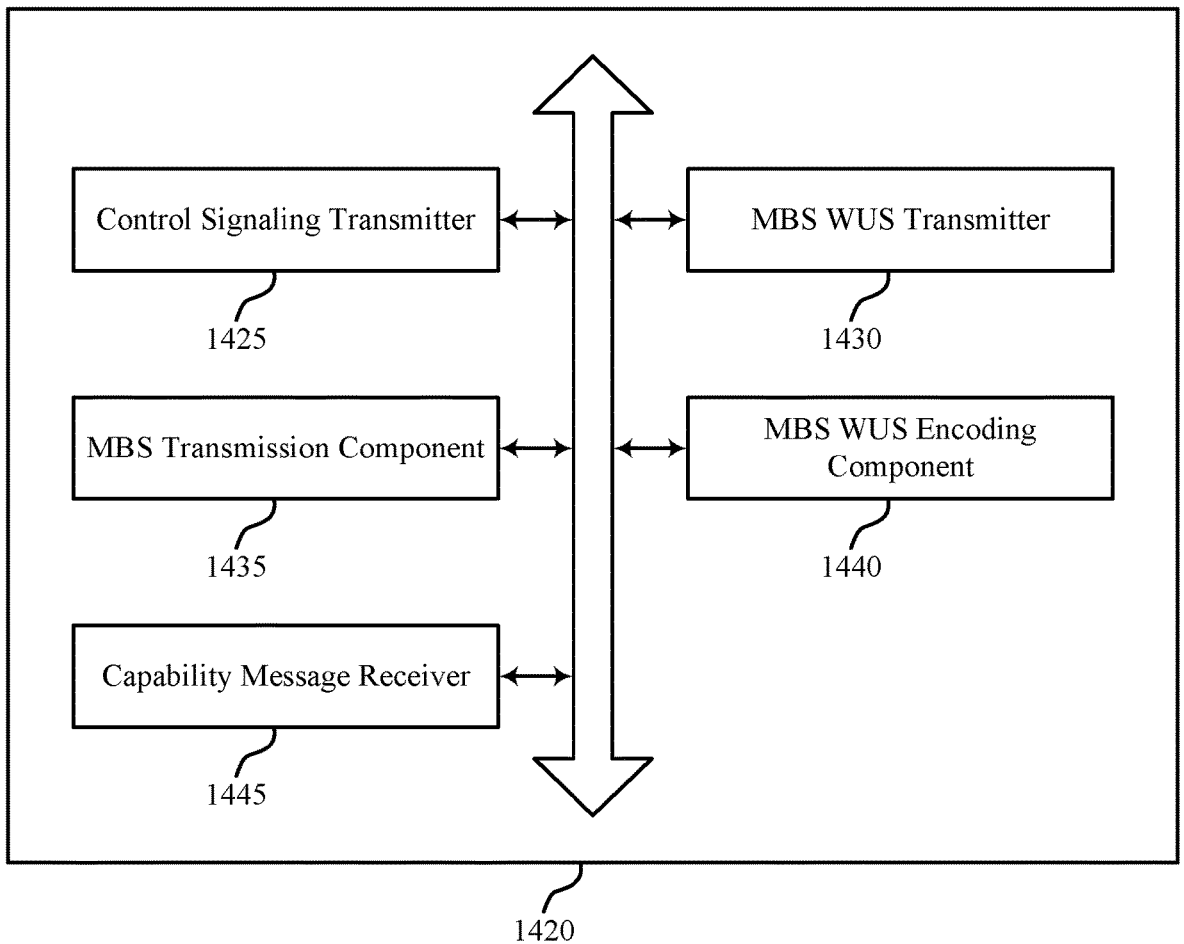
FIG. 14 shows a block diagram of a communications manager that supports WUS for multicast group notification in accordance with aspects of the present disclosure.

FIG. 14 shows a block diagram 1400 of a communications manager 1420 that supports WUS for multicast group notification in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of WUS for multicast group notification as described herein. For example, the communications manager 1420 may include a control signaling transmitter 1425, an MBS WUS transmitter 1430, an MBS transmission component 1435, an MBS WUS encoding component 1440, a capability message receiver 1445, or any combination thereof. Each of these components may communicate, directly or indirectly, with one another (e.g., via one or more buses).

The communications manager 1420 may support wireless communications at the device 1405 in accordance with examples as disclosed herein. The control signaling transmitter 1425 may be configured as or otherwise support a means for transmitting control signaling that indicates one or more parameters pertaining to a multicast or broadcast WUS format. The MBS WUS transmitter 1430 may be configured as or otherwise support a means for transmitting, to a group of UEs in a C-DRX cycle, a multicast or broadcast WUS in accordance with the control signaling. In some examples, the C-DRX cycle may include a group-common C-DRX cycle. The MBS transmission component 1435 may be configured as or otherwise support a means for transmitting a multicast or broadcast transmission to the group of UEs in accordance with the multicast or broadcast WUS.

In some examples, the MBS WUS encoding component 1440 may be configured as or otherwise support a means for encoding the multicast or broadcast WUS based on a RNTI associated with the multicast or broadcast WUS format, where transmitting the multicast or broadcast WUS is based on encoding the multicast or broadcast WUS.

In some examples, to support transmitting the control signaling, the control signaling transmitter 1425 may be configured as or otherwise support a means for transmitting RRC signaling that indicates a PDCCH format, a bit offset field for the PDCCH format, a timing parameter specific to the C-DRX cycle, a timing offset between the multicast or broadcast WUS and the multicast or broadcast transmission, or a combination thereof.

In some examples, to support transmitting the multicast or broadcast WUS, the MBS WUS transmitter 1430 may be configured as or otherwise support a means for transmitting the multicast or broadcast WUS in one or more CORESETs of a CFR.

In some examples, to support transmitting the multicast or broadcast WUS, the MBS WUS transmitter 1430 may be configured as or otherwise support a means for transmitting the multicast or broadcast WUS in one or more CSSs.

In some examples, the capability message receiver 1445 may be configured as or otherwise support a means for receiving, from a first UE in the group of UEs, a capability message indicating a capability of the first UE to receive multicast or broadcast WUSs, where transmitting the multicast or broadcast WUS is based on the capability message.

Figure 15:
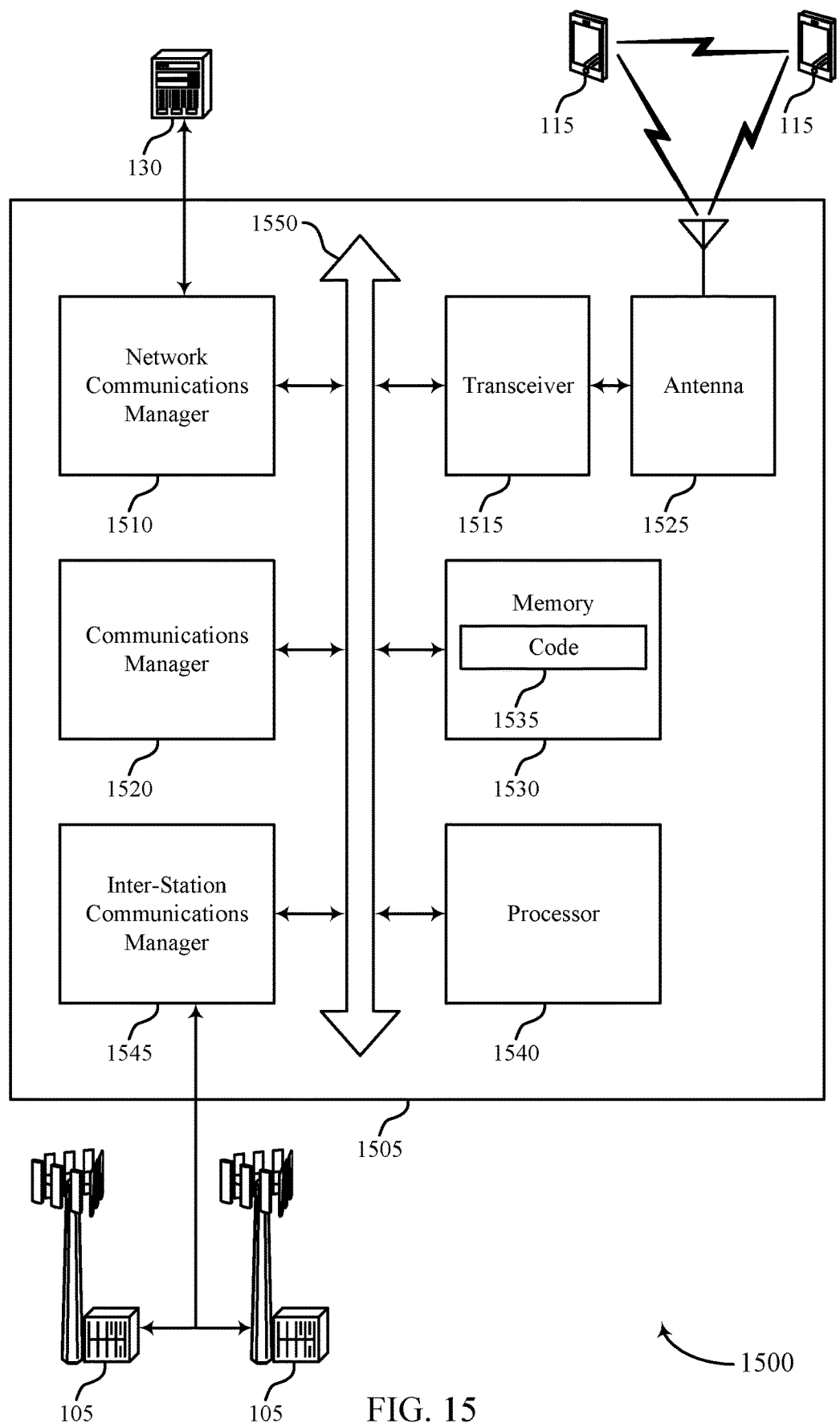
FIG. 15 shows a diagram of a system including a device that supports WUS for multicast group notification in accordance with aspects of the present disclosure.

FIG. 15 shows a diagram of a system 1500 including a device 1505 that supports WUS for multicast group notification in accordance with aspects of the present disclosure. The device 1505 may be an example of or include the components of a device 1205, a device 1305, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting WUS for multicast group notification). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communications at the device 1505 in accordance with examples as disclosed herein. For example, the communications manager 1520 may be configured as or otherwise support a means for transmitting control signaling that indicates one or more parameters pertaining to a multicast or broadcast WUS format. The communications manager 1520 may be configured as or otherwise support a means for transmitting, to a group of UEs in a C-DRX cycle, a multicast or broadcast WUS in accordance with the control signaling. The communications manager 1520 may be configured as or otherwise support a means for transmitting a multicast or broadcast transmission to the group of UEs in accordance with the multicast or broadcast WUS.

By including or configuring the communications manager 1520 in accordance with examples as described herein, the device 1505 may support techniques for more efficient C-DRX operations, among other benefits. For example, the described techniques may enable the device 1505 to indicate a number of upcoming MBS transmissions with a single MBS WUS rather than multiple UE-specific WUSs. In other words, the device 1505 may transmit a single MBS WUS to a group of UEs 115 (e.g., UEs 115 in a C-DRX cycle), as opposed to transmitting a UE-specific WUS to each UE 115 in the group of UEs 115. As a result, the described techniques may enable the device 1505 to indicate upcoming MBS transmissions with improved efficiency and reduced signaling overhead, among other benefits.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of WUS for multicast group notification as described herein, or the processor 1540 and the memory 1530 may be otherwise configured to perform or support such operations.

Figure 16:
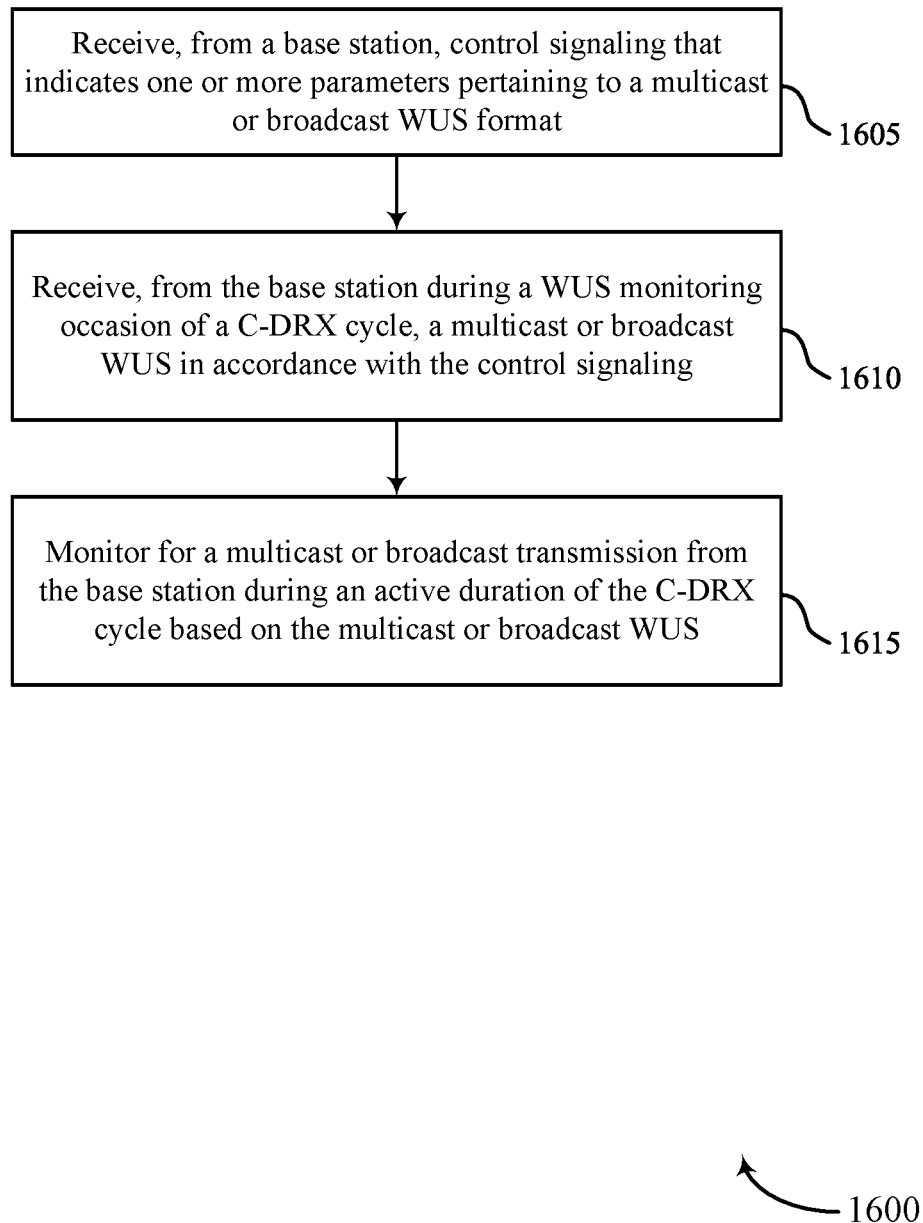
FIGS. 16 through 19 show flowcharts illustrating methods that support WUS for multicast group notification in accordance with aspects of the present disclosure.

FIG. 16 shows a flowchart illustrating a method 1600 that supports WUS for multicast group notification in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, control signaling that indicates one or more parameters pertaining to a multicast or broadcast WUS format. The operations of 1605 may be performed in accordance with examples as disclosed herein. In some examples, aspects of the operations of 1605 may be performed by a control signaling receiver 1025 as described with reference to FIG. 10.

At 1610, the method may include receiving, from the base station during a WUS monitoring occasion of a C-DRX cycle, a multicast or broadcast WUS in accordance with the control signaling. The operations of 1610 may be performed in accordance with examples as disclosed herein. In some examples, aspects of the operations of 1610 may be performed by an MBS WUS receiver 1030 as described with reference to FIG. 10.

At 1615, the method may include monitoring for a multicast or broadcast transmission from the base station during an active duration of the C-DRX cycle based on the multicast or broadcast WUS. The operations of 1615 may be performed in accordance with examples as disclosed herein. In some examples, aspects of the operations of 1615 may be performed by an MBS transmission monitoring component 1035 as described with reference to FIG. 10.

Figure 17:
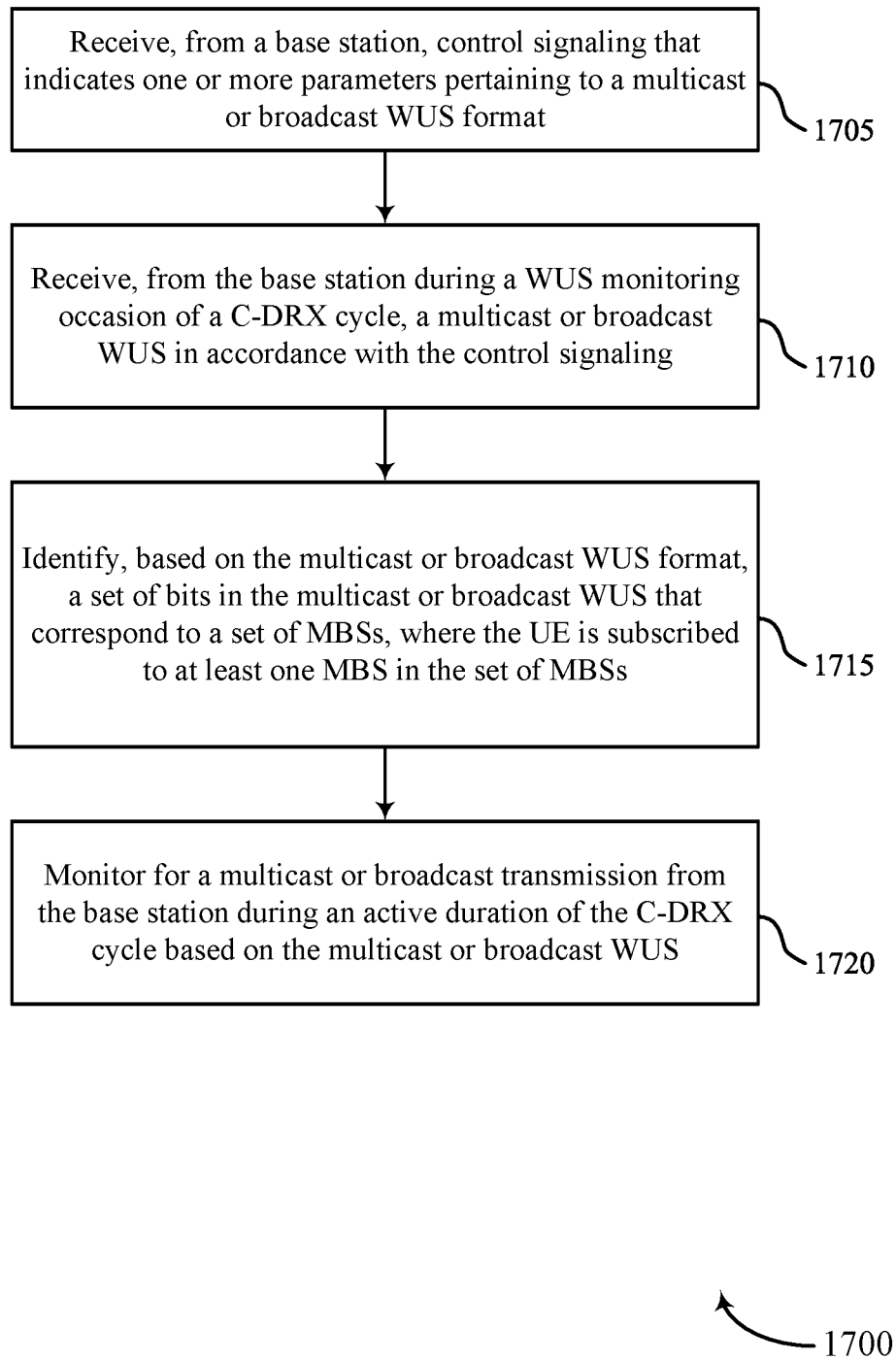

FIG. 17 shows a flowchart illustrating a method 1700 that supports WUS for multicast group notification in accordance with aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1705, the method may include receiving, from a base station, control signaling that indicates one or more parameters pertaining to a multicast or broadcast WUS format. The operations of 1705 may be performed in accordance with examples as disclosed herein. In some examples, aspects of the operations of 1705 may be performed by a control signaling receiver 1025 as described with reference to FIG. 10.

At 1710, the method may include receiving, from the base station during a WUS monitoring occasion of a C-DRX cycle, a multicast or broadcast WUS in accordance with the control signaling. The operations of 1710 may be performed in accordance with examples as disclosed herein. In some examples, aspects of the operations of 1710 may be performed by an MBS WUS receiver 1030 as described with reference to FIG. 10.

At 1715, the method may include identifying, based on the multicast or broadcast WUS format, a set of bits in the multicast or broadcast WUS that correspond to a set of MBSs, where the UE is subscribed to at least one MBS in the set of MBSs. The operations of 1715 may be performed in accordance with examples as disclosed herein. In some examples, aspects of the operations of 1715 may be performed by a bit identifying component 1050 as described with reference to FIG. 10.

At 1720, the method may include monitoring for a multicast or broadcast transmission from the base station during an active duration of the C-DRX cycle based on the multicast or broadcast WUS. The operations of 1720 may be performed in accordance with examples as disclosed herein. In some examples, aspects of the operations of 1720 may be performed by an MBS transmission monitoring component 1035 as described with reference to FIG. 10.

Figure 18:
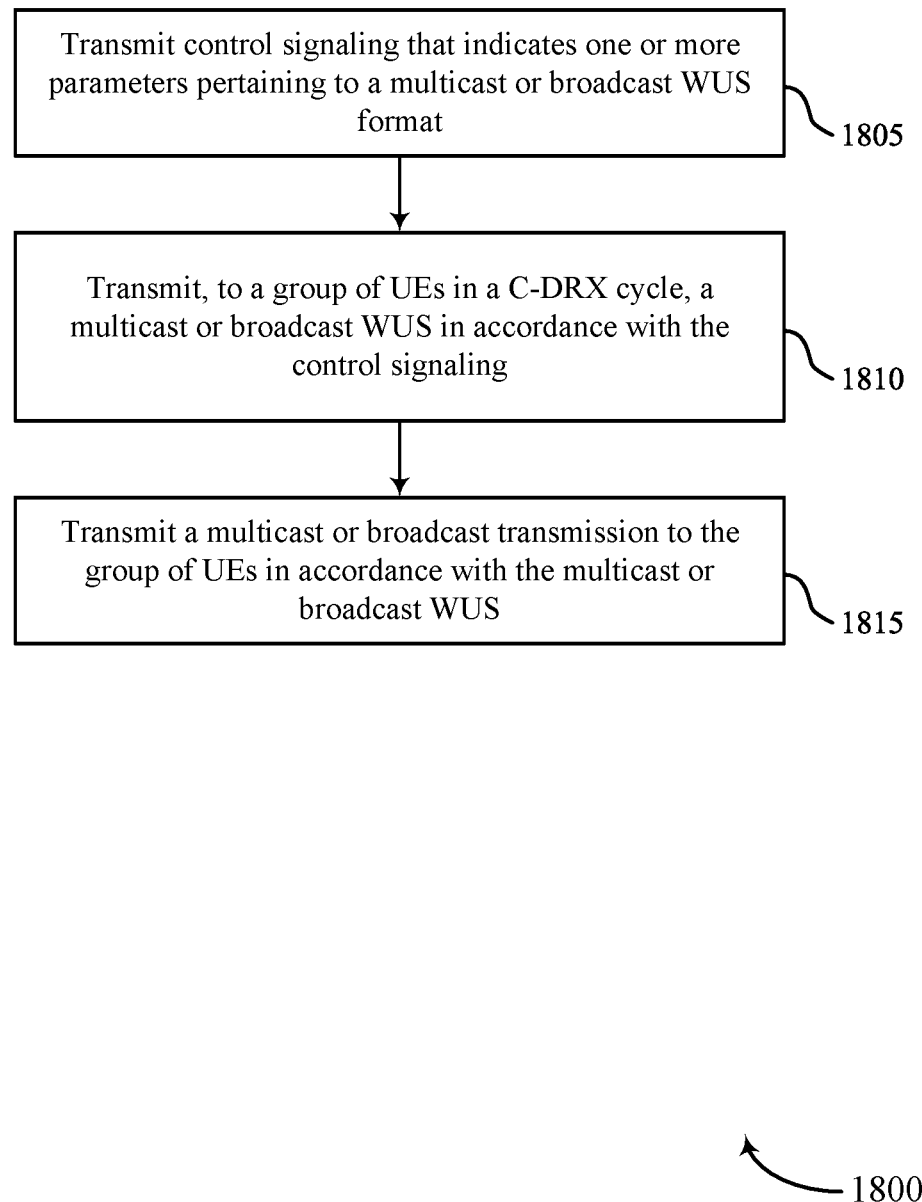

FIG. 18 shows a flowchart illustrating a method 1800 that supports WUS for multicast group notification in accordance with aspects of the present disclosure. The operations of the method 1800 may be implemented by a base station or its components as described herein. For example, the operations of the method 1800 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform aspects of the described functions using special-purpose hardware.

At 1805, the method may include transmitting control signaling that indicates one or more parameters pertaining to a multicast or broadcast WUS format. The operations of 1805 may be performed in accordance with examples as disclosed herein. In some examples, aspects of the operations of 1805 may be performed by a control signaling transmitter 1425 as described with reference to FIG. 14.

At 1810, the method may include transmitting, to a group of UEs in a C-DRX cycle, a multicast or broadcast WUS in accordance with the control signaling. The operations of 1810 may be performed in accordance with examples as disclosed herein. In some examples, aspects of the operations of 1810 may be performed by an MBS WUS transmitter 1430 as described with reference to FIG. 14.

At 1815, the method may include transmitting a multicast or broadcast transmission to the group of UEs in accordance with the multicast or broadcast WUS. The operations of 1815 may be performed in accordance with examples as disclosed herein. In some examples, aspects of the operations of 1815 may be performed by an MBS transmission component 1435 as described with reference to FIG. 14.

Figure 19:
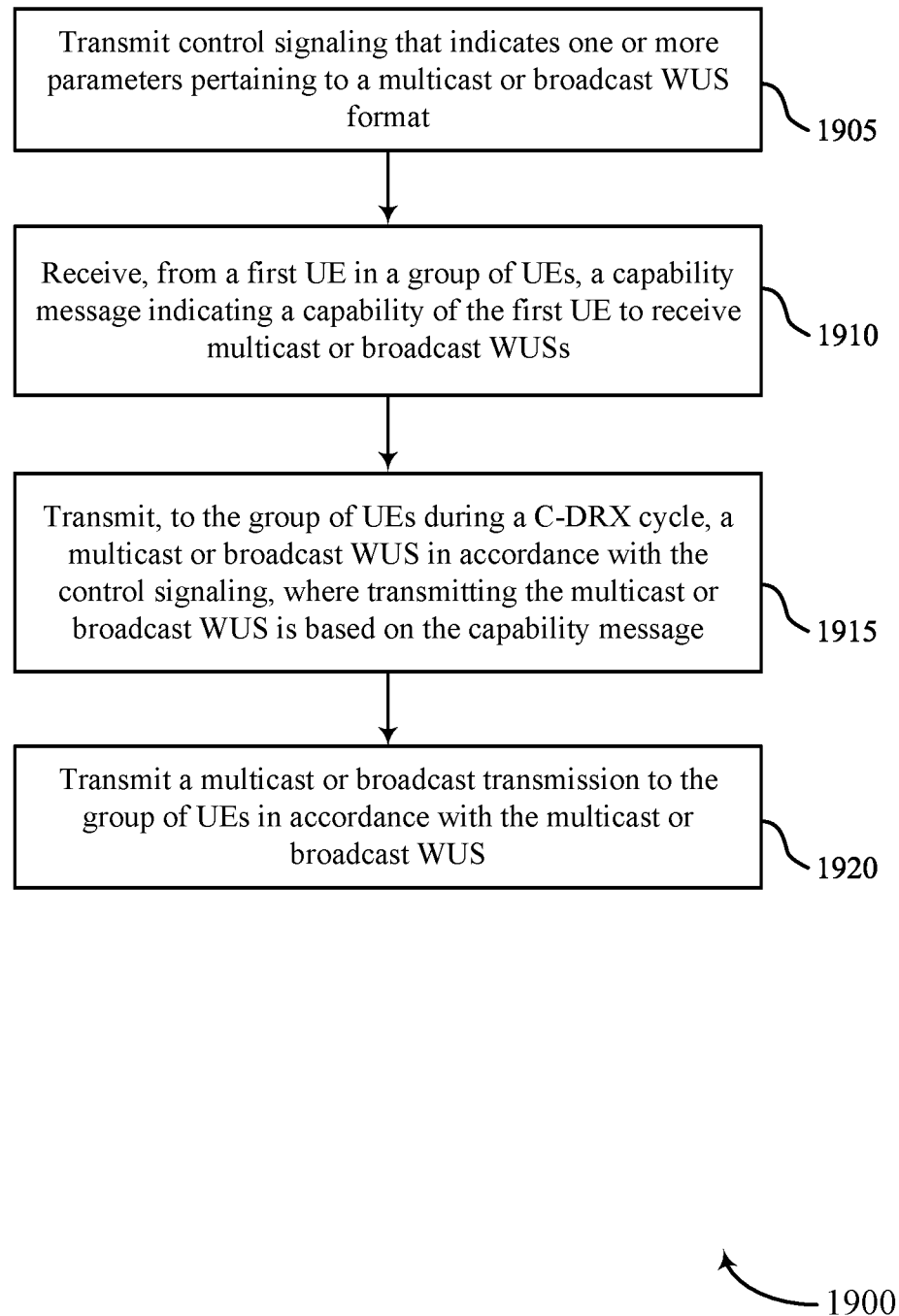

FIG. 19 shows a flowchart illustrating a method 1900 that supports WUS for multicast group notification in accordance with aspects of the present disclosure. The operations of the method 1900 may be implemented by a base station or its components as described herein. For example, the operations of the method 1900 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform aspects of the described functions using special-purpose hardware.

At 1905, the method may include transmitting control signaling that indicates one or more parameters pertaining to a multicast or broadcast WUS format. The operations of 1905 may be performed in accordance with examples as disclosed herein. In some examples, aspects of the operations of 1905 may be performed by a control signaling transmitter 1425 as described with reference to FIG. 14.

At 1910, the method may include receiving, from a first UE in a group of UEs, a capability message indicating a capability of the first UE to receive multicast or broadcast WUSs. The operations of 1910 may be performed in accordance with examples as disclosed herein. In some examples, aspects of the operations of 1910 may be performed by a capability message receiver 1445 as described with reference to FIG. 14.

At 1915, the method may include transmitting, to the group of UEs during a C-DRX cycle, a multicast or broadcast WUS in accordance with the control signaling, where transmitting the multicast or broadcast WUS is based on the capability message. The operations of 1915 may be performed in accordance with examples as disclosed herein. In some examples, aspects of the operations of 1915 may be performed by an MBS WUS transmitter 1430 as described with reference to FIG. 14.

At 1920, the method may include transmitting a multicast or broadcast transmission to the group of UEs in accordance with the multicast or broadcast WUS. The operations of 1920 may be performed in accordance with examples as disclosed herein. In some examples, aspects of the operations of 1920 may be performed by an MBS transmission component 1435 as described with reference to FIG. 14.

The following provides an overview of aspects of the present disclosure:

Aspect 1: A method for wireless communications at a UE, comprising: receiving, from a base station, control signaling that indicates one or more parameters pertaining to a multicast or broadcast wake up signal format; receiving, from the base station during a wake up signal monitoring occasion of a connected mode discontinuous reception cycle, a multicast or broadcast wake up signal in accordance with the control signaling; monitoring for a multicast or broadcast transmission from the base station during an active duration of the connected mode discontinuous reception cycle based at least in part on the multicast or broadcast wake up signal.

Aspect 2: The method of aspect 1, further comprising: receiving the multicast or broadcast transmission from the base station during the active duration based at least in part on the monitoring.

Aspect 3: The method of any of aspects 1 through 2, further comprising: decoding the multicast or broadcast wake up signal based at least in part on a radio network temporary identifier associated with the multicast or broadcast wake up signal format, wherein monitoring for the multicast or broadcast transmission is based at least in part on decoding the multicast or broadcast wake up signal.

Aspect 4: The method of any of aspects 1 through 3, wherein receiving the control signaling comprises: receiving, from the base station, control signaling that indicates a physical downlink control channel format, a bit offset field for the physical downlink control channel format, a timing parameter specific to the connected mode discontinuous reception cycle, a timing offset between the multicast or broadcast wake up signal and the multicast or broadcast transmission, or a combination thereof.

Aspect 5: The method of any of aspects 1 through 4, further comprising: identifying, based at least in part on the multicast or broadcast wake up signal format, a set of bits in the multicast or broadcast wake up signal that correspond to a set of multicast or broadcast services, wherein the UE is subscribed to at least one multicast or broadcast service in the set of multicast or broadcast services.

Aspect 6: The method of aspect 5, further comprising: determining, based at least in part on the set of bits, that one or more transmissions are scheduled for the at least one multicast or broadcast service in the active duration, wherein monitoring for the multicast or broadcast transmission is based at least in part on the determining.

Aspect 7: The method of aspect 6, further comprising: identifying a mapping between the set of bits and the set of multicast or broadcast services based at least in part on a hash function and a multicast or broadcast session identifier, wherein determining that one or more transmissions are scheduled for the at least one multicast or broadcast service is based at least in part on the mapping.

Aspect 8: The method of aspect 7, further comprising: determining, based at least in part on the mapping, that a first bit in the set of bits corresponds to two or more multicast or broadcast services in the set of multicast or broadcast services.

Aspect 9: The method of any of aspects 1 through 8, wherein receiving the control signaling comprises: receiving, from the base station, radio resource control signaling that indicates the one or more parameters pertaining to the multicast or broadcast wake up signal format.

Aspect 10: The method of any of aspects 1 through 9, further comprising: determining that at least a part of the active duration overlaps with a second active duration of a second connected mode discontinuous reception cycle; and receiving, from the base station, downlink control information indicating whether the UE is to monitor for transmissions in the active duration, the second active duration, or both, wherein monitoring for the multicast or broadcast transmission is based at least in part on the downlink control information.

Aspect 11: The method of any of aspects 1 through 10, further comprising: receiving, from the base station, a message indicating a primary multicast or broadcast connected mode discontinuous reception configuration associated with the connected mode discontinuous reception cycle of the UE, a secondary multicast or broadcast connected mode discontinuous reception configuration associated with a second connected mode discontinuous reception cycle of the UE, or both, wherein receiving the multicast or broadcast wake up signal from the base station is based at least in part on the message.

Aspect 12: The method of aspect 11, further comprising: receiving, from the base station during a wake up signal monitoring occasion of the second connected mode discontinuous reception cycle, a second multicast or broadcast wake up signal in accordance with the secondary multicast or broadcast connected mode discontinuous reception configuration.

Aspect 13: The method of any of aspects 1 through 12, wherein the connected mode discontinuous reception cycle comprises a group common connected mode discontinuous reception cycle.

Aspect 14: The method of any of aspects 1 through 13, wherein receiving the multicast or broadcast wake up signal comprises: monitoring one or more control resource sets in a common frequency region based at least in part on the control signaling; and receiving the multicast or broadcast wake up signal from the base station based at least in part on monitoring the one or more control resource sets.

Aspect 15: The method of any of aspects 1 through 14, wherein receiving the multicast or broadcast wake up signal comprises: monitoring one or more common search spaces in accordance with the control signaling; and receiving the multicast or broadcast wake up signal from the base station based at least in part on monitoring the one or more common search spaces.

Aspect 16: The method of any of aspects 1 through 15, further comprising: identifying, based at least in part on the multicast or broadcast wake up signal format, one or more bits in the multicast or broadcast wake up signal that indicate dormancy information pertaining to a set of secondary cells.

Aspect 17: The method of any of aspects 1 through 16, further comprising: activating a discontinuous reception timer based at least in part on receiving the multicast or broadcast wake up signal, wherein monitoring for the multicast or broadcast transmission is based at least in part on the discontinuous reception timer.

Aspect 18: The method of any of aspects 1 through 17, further comprising: transmitting, to the base station, a capability message indicating a capability of the UE to receive multicast or broadcast wake up signals, wherein receiving the multicast or broadcast wake up signal is based at least in part on the capability message Aspect 19: A method for wireless communications at a base station, comprising: transmitting control signaling that indicates one or more parameters pertaining to a multicast or broadcast wake up signal format; transmitting, to a group of UEs in a connected mode discontinuous reception cycle, a multicast or broadcast wake up signal in accordance with the control signaling; and transmitting a multicast or broadcast transmission to the group of UEs in accordance with the multicast or broadcast wake up signal.

Aspect 20: The method of aspect 19, further comprising: encoding the multicast or broadcast wake up signal based at least in part on a radio network temporary identifier associated with the multicast or broadcast wake up signal format, wherein transmitting the multicast or broadcast wake up signal is based at least in part on encoding the multicast or broadcast wake up signal.

Aspect 21: The method of any of aspects 19 through 20, wherein transmitting the control signaling comprises: transmitting radio resource control signaling that indicates a physical downlink control channel format, a bit offset field for the physical downlink control channel format, a timing parameter specific to the connected mode discontinuous reception cycle, a timing offset between the multicast or broadcast wake up signal and the multicast or broadcast transmission, or a combination thereof.

Aspect 22: The method of any of aspects 19 through 21, wherein transmitting the multicast or broadcast wake up signal comprises: transmitting the multicast or broadcast wake up signal in one or more control resource sets of a common frequency region.

Aspect 23: The method of any of aspects 19 through 22, wherein transmitting the multicast or broadcast wake up signal comprises: transmitting the multicast or broadcast wake up signal in one or more common search spaces.

Aspect 24: The method of any of aspects 19 through 23, further comprising: receiving, from a first UE in the group of UEs, a capability message indicating a capability of the first UE to receive multicast or broadcast wake up signals, wherein transmitting the multicast or broadcast wake up signal is based at least in part on the capability message.

Aspect 25: The method of any of aspects 19 through 24, wherein the connected mode discontinuous reception cycle comprises a group common connected mode discontinuous reception cycle.

Aspect 26: An apparatus for wireless communications at a UE, comprising a processor; memory coupled with the processor; and instructions stored in the memory and executable by the processor to cause the apparatus to perform a method of any of aspects 1 through 18.

Aspect 27: An apparatus for wireless communications at a UE, comprising at least one means for performing a method of any of aspects 1 through 18.

Aspect 28: A non-transitory computer-readable medium storing code for wireless communications at a UE, the code comprising instructions executable by a processor to perform a method of any of aspects 1 through 18.

Aspect 29: An apparatus for wireless communications at a base station, comprising a processor; memory coupled with the processor; and instructions stored in the memory and executable by the processor to cause the apparatus to perform a method of any of aspects 19 through 25.

Aspect 30: An apparatus for wireless communications at a base station, comprising at least one means for performing a method of any of aspects 19 through 25.

Aspect 31: A non-transitory computer-readable medium storing code for wireless communications at a base station, the code comprising instructions executable by a processor to perform a method of any of aspects 19 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." Additionally, as used herein, the phrase "a set" shall be construed as including the possibility of a set with one member. That is, the phrase "a set" shall be construed in the same manner as the phrase "one or more."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
   at least one processor;
   at least one memory coupled with the at least one processor; and
   instructions stored in the at least one memory and executable by the at least one processor to cause the UE to:
      receive control signaling that indicates one or more parameters pertaining to a multicast or broadcast wake up signal format;
      receive, during a wake up signal monitoring occasion of a connected mode discontinuous reception cycle, a multicast or broadcast wake up signal in accordance with the control signaling;
      identify, based at least in part on the multicast or broadcast wake up signal format, an indication comprising a set of bits in the multicast or broadcast wake up signal that corresponds to a set of multicast or broadcast services, wherein the UE is subscribed to at least one multicast or broadcast service in the set of multicast or broadcast services; and
      monitor for a multicast or broadcast transmission during an active duration of the connected mode discontinuous reception cycle based at least in part on the multicast or broadcast wake up signal.

2. The UE of claim 1, wherein the instructions are further executable by the at least one processor to cause the UE to:
   receive the multicast or broadcast transmission during the active duration based at least in part on the monitoring.

3. The UE of claim 1, wherein the instructions are further executable by the at least one processor to cause the UE to:
   decode the multicast or broadcast wake up signal based at least in part on a radio network temporary identifier associated with the multicast or broadcast wake up signal format, wherein monitoring for the multicast or broadcast transmission is based at least in part on decoding the multicast or broadcast wake up signal.

4. The UE of claim 1, wherein to receive the control signaling, the instructions are executable by the at least one processor to cause the UE to:

receive the control signaling that indicates a physical downlink control channel format, a bit offset field for the physical downlink control channel format, a timing parameter specific to the connected mode discontinuous reception cycle, a timing offset between the multicast or broadcast wake up signal and the multicast or broadcast transmission, or a combination thereof.

5. The UE of claim 1, wherein the instructions are further executable by the at least one processor to cause the UE to:
determine, based at least in part on the set of bits, that one or more transmissions are scheduled for the at least one multicast or broadcast service in the active duration, wherein monitoring for the multicast or broadcast transmission is based at least in part on the determining.

6. The UE of claim 1, wherein the instructions are further executable by the at least one processor to cause the UE to:
identify a mapping between the set of bits and the set of multicast or broadcast services based at least in part on a hash function and a multicast or broadcast session identifier, wherein determining that one or more transmissions are scheduled for the at least one multicast or broadcast service is based at least in part on the mapping.

7. The UE of claim 6, wherein the instructions are further executable by the at least one processor to cause the UE to:
determine, based at least in part on the mapping, that a first bit in the set of bits corresponds to two or more multicast or broadcast services in the set of multicast or broadcast services.

8. The UE of claim 1, wherein to receive the control signaling, the instructions are executable by the at least one processor to cause the UE to:
receive radio resource control signaling that indicates the one or more parameters pertaining to the multicast or broadcast wake up signal format.

9. The UE of claim 1, wherein the instructions are further executable by the at least one processor to cause the UE to:
determine that at least a part of the active duration overlaps with a second active duration of a second connected mode discontinuous reception cycle; and
receive downlink control information indicating whether the UE is to monitor for transmissions in the active duration, the second active duration, or both, wherein monitoring for the multicast or broadcast transmission is based at least in part on the downlink control information.

10. The UE of claim 1, wherein the instructions are further executable by the at least one processor to cause the UE to:
receive a message indicating a primary multicast or broadcast connected mode discontinuous reception configuration associated with the connected mode discontinuous reception cycle of the UE, a secondary multicast or broadcast connected mode discontinuous reception configuration associated with a second connected mode discontinuous reception cycle of the UE, or both, wherein receiving the multicast or broadcast wake up signal is based at least in part on the message.

11. The UE of claim 10, wherein the instructions are further executable by the at least one processor to cause the UE to:
receive, during a wake up signal monitoring occasion of the second connected mode discontinuous reception cycle, a second multicast or broadcast wake up signal in accordance with the secondary multicast or broadcast connected mode discontinuous reception configuration.

12. The UE of claim 1, wherein the connected mode discontinuous reception cycle comprises a group-common connected mode discontinuous reception cycle.

13. The UE of claim 1, wherein to receive the multicast or broadcast wake up signal, the instructions are executable by the at least one processor to cause the UE to:
monitor one or more control resource sets in a common frequency region based at least in part on the control signaling; and
receive the multicast or broadcast wake up signal based at least in part on monitoring the one or more control resource sets.

14. The UE of claim 1, wherein to receive the multicast or broadcast wake up signal, the instructions are executable by the at least one processor to cause the UE to:
monitor one or more common search spaces in accordance with the control signaling; and
receive the multicast or broadcast wake up signal based at least in part on monitoring the one or more common search spaces.

15. The UE of claim 1, wherein the instructions are further executable by the at least one processor to cause the UE to:
identify, based at least in part on the multicast or broadcast wake up signal format, one or more bits in the multicast or broadcast wake up signal that indicate dormancy information pertaining to a set of secondary cells.

16. The UE of claim 1, wherein the instructions are further executable by the at least one processor to cause the UE to:
activate a discontinuous reception timer based at least in part on receiving the multicast or broadcast wake up signal, wherein monitoring for the multicast or broadcast transmission is based at least in part on the discontinuous reception timer.

17. The UE of claim 1, wherein the instructions are further executable by the at least one processor to cause the UE to:
transmit a capability message indicating a capability of the UE to receive multicast or broadcast wake up signals, wherein receiving the multicast or broadcast wake up signal is based at least in part on the capability message.

18. A method for wireless communications at a user equipment (UE), comprising:
receiving control signaling that indicates one or more parameters pertaining to a multicast or broadcast wake up signal format;
receiving, during a wake up signal monitoring occasion of a connected mode discontinuous reception cycle, a multicast or broadcast wake up signal in accordance with the control signaling;
identifying, based at least in part on the multicast or broadcast wake up signal format, an indication comprising a set of bits in the multicast or broadcast wake up signal that corresponds to a set of multicast or broadcast services, wherein the UE is subscribed to at least one multicast or broadcast service in the set of multicast or broadcast services; and
monitoring for a multicast or broadcast transmission during an active duration of the connected mode discontinuous reception cycle based at least in part on the multicast or broadcast wake up signal.

19. The method of claim 18, further comprising:
decoding the multicast or broadcast wake up signal based at least in part on a radio network temporary identifier associated with the multicast or broadcast wake up signal format, wherein monitoring for the multicast or broadcast transmission is based at least in part on decoding the multicast or broadcast wake up signal.

20. The method of claim 18, further comprising:
determining, based at least in part on the set of bits, that one or more transmissions are scheduled for the at least one multicast or broadcast service in the active duration, wherein monitoring for the multicast or broadcast transmission is based at least in part on the determining.

21. The method of claim 18, further comprising:
identifying a mapping between the set of bits and the set of multicast or broadcast services based at least in part on a hash function and a multicast or broadcast session identifier, wherein determining that one or more transmissions are scheduled for the at least one multicast or broadcast service is based at least in part on the mapping.

22. The method of claim 21, further comprising:
determining, based at least in part on the mapping, that a first bit in the set of bits corresponds to two or more multicast or broadcast services in the set of multicast or broadcast services.

23. The method of claim 18, wherein receiving the control signaling comprises:
receiving control signaling that indicates a physical downlink control channel format, a bit offset field for the physical downlink control channel format, a timing parameter specific to the connected mode discontinuous reception cycle, a timing offset between the multicast or broadcast wake up signal and the multicast or broadcast transmission, or a combination thereof.

24. The method of claim 18, further comprising:
receiving the multicast or broadcast transmission during the active duration based at least in part on the monitoring.

25. The method of claim 18, wherein receiving the control signaling comprises:
receiving radio resource control signaling that indicates the one or more parameters pertaining to the multicast or broadcast wake up signal format.

26. The method of claim 18, further comprising:
determining that at least a part of the active duration overlaps with a second active duration of a second connected mode discontinuous reception cycle; and
receiving downlink control information indicating whether the UE is to monitor for transmissions in the active duration, the second active duration, or both, wherein monitoring for the multicast or broadcast transmission is based at least in part on the downlink control information.

27. An apparatus, comprising:
means for receiving control signaling that indicates one or more parameters pertaining to a multicast or broadcast wake up signal format;
means for receiving, during a wake up signal monitoring occasion of a connected mode discontinuous reception cycle, a multicast or broadcast wake up signal in accordance with the control signaling;
means for identifying, based at least in part on the multicast or broadcast wake up signal format, an indication comprising a set of bits in the multicast or broadcast wake up signal that corresponds to a set of multicast or broadcast services, wherein the UE is subscribed to at least one multicast or broadcast service in the set of multicast or broadcast services; and
means for monitoring for a multicast or broadcast transmission during an active duration of the connected mode discontinuous reception cycle based at least in part on the multicast or broadcast wake up signal.

28. A non-transitory computer-readable medium storing code for wireless communications, the code comprising instructions executable by one or more processors to:
receive control signaling that indicates one or more parameters pertaining to a multicast or broadcast wake up signal format;
receive, during a wake up signal monitoring occasion of a connected mode discontinuous reception cycle, a multicast or broadcast wake up signal in accordance with the control signaling;
identify, based at least in part on the multicast or broadcast wake up signal format, an indication comprising a set of bits in the multicast or broadcast wake up signal that corresponds to a set of multicast or broadcast services, wherein the UE is subscribed to at least one multicast or broadcast service in the set of multicast or broadcast services; and
monitor for a multicast or broadcast transmission during an active duration of the connected mode discontinuous reception cycle based at least in part on the multicast or broadcast wake up signal.

* * * * *